(12) United States Patent
Nakamura et al.

(10) Patent No.: US 9,167,030 B2
(45) Date of Patent: Oct. 20, 2015

(54) APPLICATION EXECUTION SYSTEM, COMPUTER, APPLICATION EXECUTION DEVICE, AND CONTROL METHOD AND PROGRAM FOR AN APPLICATION EXECUTION SYSTEM

(71) Applicant: Seiko Epson Corporation, Tokyo (JP)

(72) Inventors: Hideo Nakamura, Nagano-ken (JP); Takanori Yamada, Nagano-ken (JP); Hirotada Yokosawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 97 days.

(21) Appl. No.: 14/177,369

(22) Filed: Feb. 11, 2014

(65) Prior Publication Data
US 2014/0164490 A1 Jun. 12, 2014

Related U.S. Application Data

(63) Continuation of application No. 12/019,275, filed on Jan. 24, 2008, now abandoned.

(30) Foreign Application Priority Data

| Jan. 30, 2007 | (JP) | ................................. 2007-018871 |
| Feb. 1, 2007 | (JP) | ................................. 2007-022672 |
| Feb. 23, 2007 | (JP) | ................................. 2007-043399 |

(51) Int. Cl.
*H04L 29/00* (2006.01)
*H04L 29/08* (2006.01)
*H04L 29/14* (2006.01)

(52) U.S. Cl.
CPC .......... *H04L 67/10* (2013.01); *H04L 29/08846* (2013.01); *H04L 67/28* (2013.01); *H04L 69/40* (2013.01); *H04L 67/1095* (2013.01); *H04L 67/289* (2013.01); *H04L 67/2861* (2013.01)

(58) Field of Classification Search
CPC ..................................................... H04L 67/10
USPC .................................................. 707/10; 714/6
See application file for complete search history.

(56) References Cited

U.S. PATENT DOCUMENTS

| 6,092,191 A | 7/2000 | Shimbo et al. |
| 6,185,680 B1 | 2/2001 | Shimbo et al. |

(Continued)

FOREIGN PATENT DOCUMENTS

| EP | 1107537 A2 | 6/2001 |
| JP | 04-215142 | 8/1992 |

(Continued)

OTHER PUBLICATIONS

Half-Pipe Anchoring: An Efficient Technique for Multiple Connection Handoff, Ravi Kokku, Ramakrishnan Rajamony, Lorenzo Alvisi, Harrick Vin, Dept. of Computer Sciences, University of Texas, Austin, (Rkoku, Lorenzo, Vin), Austin Research Lab, IBM, Austin, (Rajamony), IEEE Computer Society, Jan. 2002.

*Primary Examiner* — Brandon Hoffman
*Assistant Examiner* — Helai Salehi

(57) ABSTRACT

An application execution system enables stable system operation without being affected by server performance or line quality, and without quitting the application. The application execution system 1 has an application server 2 and an application execution device 4 connected by a first network 6, and has the application execution device 4 and a client terminal 5 connected by a second network 7. The application execution device 4 detects the status of the acquired application 11a, runs the application 11a if the application is normal and has the application server 2 run the application if an error or problem is detected. Based on the execution request from the application execution device 4, the application server 2 runs a substitute application 11b.

11 Claims, 18 Drawing Sheets

(56) References Cited

U.S. PATENT DOCUMENTS

| | | | |
|---|---|---|---|
| 6,574,229 B1 | 6/2003 | Takahashi et al. | |
| 6,859,889 B2 | 2/2005 | Matsuura et al. | |
| 7,532,620 B2 | 5/2009 | Sudo et al. | |
| 7,554,992 B2 | 6/2009 | Kimura et al. | |
| 7,778,991 B2 | 8/2010 | Aosawa | |
| 8,266,473 B2 | 9/2012 | Casale et al. | |
| 2001/0044841 A1 | 11/2001 | Kosugi et al. | |
| 2003/0167298 A1* | 9/2003 | Bazinet et al. | 709/203 |
| 2003/0187978 A1 | 10/2003 | Nakamura et al. | |
| 2005/0165728 A1 | 7/2005 | Aosawa | |
| 2006/0047836 A1* | 3/2006 | Rao et al. | 709/229 |
| 2006/0090097 A1* | 4/2006 | Ngan et al. | 714/6 |
| 2006/0149741 A1* | 7/2006 | Krishnamoorthy | 707/10 |
| 2006/0168220 A1 | 7/2006 | Katoh et al. | |

FOREIGN PATENT DOCUMENTS

| | | |
|---|---|---|
| JP | 09-120325 | 5/1997 |
| JP | 09-214556 | 8/1997 |
| JP | 09-259096 | 10/1997 |
| JP | 10-023234 | 1/1998 |
| JP | 2000-132524 | 5/2000 |
| JP | 2000-310938 | 11/2000 |
| JP | 2001-117899 | 4/2001 |
| JP | 2001-306349 | 11/2001 |
| JP | 2001-306539 | 11/2001 |
| JP | 2001-325124 | 11/2001 |
| JP | 2002-169704 | 6/2002 |
| JP | 2002-259355 | 9/2002 |
| JP | 2002-312312 | 10/2002 |
| JP | 2003-186380 | 7/2003 |
| JP | 2003-288285 | 10/2003 |
| JP | 2004-118689 | 4/2004 |
| JP | 2004-287889 | 10/2004 |
| JP | 2004-295538 | 10/2004 |
| JP | 2005-202698 | 7/2005 |
| JP | 2005-295124 | 10/2005 |
| JP | 2006-039662 | 2/2006 |
| JP | 2006-178658 | 7/2006 |
| WO | 03/007160 A1 | 1/2003 |
| WO | 2006/020823 A1 | 2/2006 |
| WO | 2006/094527 A1 | 9/2006 |

* cited by examiner

FIG. 16A

| APPLICATION NAME | STORAGE ADDRESS | |
|---|---|---|
| APPLICATION A | http://stb/web-appA/index.html (APPLICATION EXECUTION DEVICE) | http://serverA/web-appA/index.html (APPLICATION SERVER A) |
| APPLICATION B | http://stb/web-appB/index.html (APPLICATION EXECUTION DEVICE) | http://serverB/web-appB/index.html (APPLICATION SERVER B) |
| APPLICATION C | http://stb/web-appC/index.html (APPLICATION EXECUTION DEVICE) | http://serverC/web-appC/index.html (APPLICATION SERVER C) |
| APPLICATION D | http://serverD/web-appD/index.html (APPLICATION SERVER D) | |

GATEWAY    APPLICATION EXECUTION DEVICE web-appA/index.html ⇒ stb/web-appA/index.html

FIG. 16C

GATEWAY    APPLICATION SERVER A web-appA/index.html ⇒ serverA/web-appA/index.html

APPLICATION EXECUTION SYSTEM, COMPUTER, APPLICATION EXECUTION DEVICE, AND CONTROL METHOD AND PROGRAM FOR AN APPLICATION EXECUTION SYSTEM

CROSS-REFERENCE TO RELATED APPLICATIONS

This application is a continuation of, and claims priority under 35 U.S.C. §120 on U.S. application Ser. No. 12/019,275, filed Jan. 24, 2008, which claims priority under 35 U.S.C. §119 on Japanese Patent application No.(s) 2007-018871, filed Jan. 30, 2007, 2007-022672, filed Feb. 1, 2007 and 2007-043399, filed Feb. 23, 2007. Each of the above-identified applications is incorporated by reference in its entirety.

BACKGROUND

1. Field of Invention

The present invention relates to an application execution system for running a software application over a communication network such as a LAN or the Internet, to an application execution device, and to a control method and program for the application execution system.

2. Description of the Related Art

Network systems that use a server to provide an application execution service to terminals connected to the Internet are known from the literature. With the network system taught in Japanese Unexamined Patent Appl. Pub. JP-A-2003-186380, for example, the user accesses a server over the Internet from a local client terminal to run the application stored on the server and get the output data resulting from running the program.

Network systems of this type are available from different vendors, and individual users select and use the needed services. A problem with such network systems is that communication can be interrupted and a sufficiently fast response cannot be achieved when the Internet connection is unstable. Another problem is that when the server goes down or the connection is interrupted, the user cannot access the service until the system recovers. One solution for this problem is to install an application server for executing programs on the user LAN so that the client terminal accesses the application from a local server instead of accessing the server over the Internet. This arrangement enables the client terminal to get the result of executing the program by accessing the application server connected to the LAN, and eliminates the need to access the server over the Internet.

Even if the client terminal accesses a local application server, however, the client terminal cannot get the result of executing the application from the application server if there is a problem with the application running on the application server. The client terminal can get the result of executing the application by accessing the server that provides the application from the client terminal in this case, but the application must be quit and the access settings must be changed every time the application crashes, and this complicates operation.

SUMMARY OF THE INVENTION

An application execution system, application execution device, and control method and program for an application execution system according to the present invention enable stable system operation regardless of server performance or the quality of the connection, and without quitting the application.

An application execution system according to a first aspect of the invention has an application server that stores an application and an application execution device that runs the application acquired from the application server, the application server and the application execution device being connected by a first network; and a client terminal that requests execution of the application by the application execution device, the application execution device and the client terminal being connected by a second network. The application execution device comprises: a first storage device that stores the application acquired from the application server; a first processing unit that detects if execution of the application is normal or has an error; wherein the first processing unit executes the application and sends resulting output data to the client terminal when the first processing unit determines that execution of the application is normal and an application execution request is received from the client terminal; and wherein the first processing unit sends a substitute execution request to the application server when the first processing unit detects an error and an application execution request is received from the client terminal. The application server comprises: a second storage device that stores a substitute application that is identical to the application; and a second processing unit that executes the substitute application and returns resulting output data to the client terminal based on the substitute execution request.

In this application execution system preferably the first processing unit sends synchronization data including application account information and session information to the application server; and the application server updates the substitute application based on the received synchronization data.

Further, preferably, the second processing unit sends synchronization data including account information and session information for the substitute application to the application execution device; and the application execution device updates the application based on the received synchronization data for the substitute application.

In the application execution system according to another aspect of the invention, the application execution device has an execution unit including the first storage device and the first processing unit; and a switching unit that operates independently of the execution unit and that receives execution requests from the client terminal. The switching unit comprises: a third processing unit that, instead of the first processing unit, detects if the application is normal or has an error; and a monitoring tool that determines if the execution unit can run the application; and wherein the third processing unit passes the received execution request to the execution unit when the execution unit can run the application, and passes the received execution request to the application server when the execution unit cannot run the application.

In the application execution system according to another aspect of the invention, the execution unit includes an execution unit power supply circuit for supplying power to the execution unit, and the switching unit includes a switching unit power supply circuit for supplying power to the switching unit.

In the application execution system according to another aspect of the invention, the third processing unit determines if the client terminal is authorized to run the application, and forwards the execution request only when the client terminal is authorized.

In the application execution system according to another aspect of the invention the client terminal and the application execution device are connected by the second network through a gateway that relays data, and the gateway and the application server are connected by the first network. The client terminal specifies the application to run and sends an execution request to the gateway. The gateway includes an application storage table that stores application storage addresses; and the gateway: references the storage table to determine if the specified application is stored on the application execution device; determines if the application execution device can run the application; changes the execution request address to the application execution device if the specified application is stored on the application execution device and the application execution device can run the application, and changes the execution request address to the application server if the specified application is not stored on the application execution device or the application execution device cannot run the application, when an execution request is received from the client terminal, and sends the execution request to the changed execution request address. The first processing unit of the application execution device and the second processing unit of the application server run the application based on execution requests from the gateway, and return the resulting output data through the gateway to the client terminal.

Further preferably, the application execution system also has a gateway server that is connected to the gateway through the first network, and wherein the gateway server relays data between the gateway and the application server. The gateway sets the execution request address to the application execution device by encapsulating the execution request when the address of the application execution request is changed to the application execution device, and sets the execution request address to the gateway server by encapsulating the execution request when the address of the application execution request is changed to the gateway server; and the gateway sends the received output data to the client terminal. The application execution device decapsulates the execution request from the gateway, runs the application, and encapsulates and sends the resulting output data to the gateway. The gateway server decapsulates and forwards the execution request from the gateway to the application server, and encapsulates and forwards the resulting output data from the application server to the gateway. The application server runs the application based on the execution request forwarded from the gateway server, and sends the resulting output data to the gateway server.

In the application execution system according to another aspect of the invention the gateway specifies the execution request address and adds authentication information to the execution request; and the application execution device authenticates the execution request based on the authentication information; and allows running the application only when authentication of the execution request succeeds.

Yet further preferably, the application execution system also has an authentication server that is connected by the first network to the gateway server and authenticates execution requests. The gateway specifies the execution request address and adds authentication information to the execution request. The gateway server authenticates execution requests from the gateway using the authentication server when decapsulating the execution requests. The application server allows running the application only when authentication of the execution request by the authentication server succeeds.

Another aspect of the invention is an application execution device that is connected by a first network to an application server that stores an application, and is connected by a second network to a client terminal that requests execution of the application, and executes the application acquired from the application server. The application server stores a substitute application that is identical to the application, and executes the application and returns resulting output data to the client terminal based on a substitute execution request from the application execution device. The application execution device comprises: a first storage device that stores the application acquired from the application server, and a first processing unit that detects if execution of the application is normal or has an error. The first processing unit executes the application and sends resulting output data to the client terminal when the first processing unit determines that execution of the application is normal and an application execution request is received from the client terminal. The first processing unit sends a substitute execution request to the application server when the first processing unit detects an error and an application execution request is received from the client terminal.

The application execution device according to another aspect of the invention also preferably has an execution unit including the first storage device and the first processing unit, and a switching unit that operates independently of the execution unit and that receives execution requests from the client terminal. The switching unit comprises a second processing unit that, instead of the first processing unit, detects if the application is normal or has an error, and a monitoring tool that determines if the execution unit can run the application. The second processing unit passes the received execution request to the execution unit when the execution unit can run the application, and passes the received execution request to the application server when the execution unit cannot run the application.

Yet another aspect of the invention is a control method for an application execution system having an application server that serves an application and an application execution device that runs the application acquired from the application server connected by a first network, and the application execution device and a client terminal that requests execution of the application on the application execution device connected by a second network. The application execution device executes steps of storing the application acquired from the application server; detecting if the stored application is normal or has an error; executing the application and sending the resulting output data to the client terminal when the application is normal and an application execution request is received from the client terminal; and sending a substitute execution request to the application server when an error is detected and an application execution request is received from the client terminal. The application server executes steps of storing a substitute application that is identical to the served application; and executing the substitute application and returns the resulting output data to the client terminal based on the substitute execution request.

In the control method of the application execution system according to another aspect of the invention the application execution device has an execution unit that runs an application based on an execution request from the client terminal, and a switching unit that operates independently of the execution unit and changes the address to which the execution request is sent. The switching unit executes steps of: determining if the execution unit can run the application, receiving execution requests from the client terminal; and passing the received execution request to the execution unit when the execution unit can run the application, and passing the received execution request to the application server when the execution unit cannot run the application.

In the control method of the application execution system according to another aspect of the invention the client terminal and the application execution device are connected by the second network through a gateway that relays data, and the gateway and the application server are connected by the first network. The client terminal executes steps of specifying the application to run and sending the execution request to the gateway. The gateway executes steps of: referencing a database storing application storage addresses, and determining if the specified application is stored on the application execution device; determining if the application execution device can run the application; changing the execution request address to the application execution device if the specified application is stored on the application execution device and the application execution device can run the application, and changing the execution request address to the application server if the specified application is not stored on the application execution device or the application execution device cannot run the application, when an execution request is received from the client terminal, and sending the execution request to the changed execution request address. The application execution device and the application server run the application based on execution requests from the gateway, and return the resulting output data through the gateway to the client terminal.

Another aspect of the invention is tangible computer-readable medium executable by a computer to execute the steps of the control method of the application execution system described above.

These aspects of the invention afford the following benefits.

When the first network is the Internet and the second network is a LAN, the client terminal can get the result of running an application by accessing an application execution device connected to the LAN instead of over the Internet. The application can therefore be run in a stable environment without being affected by the Internet connection.

When there is a problem with the application on the application execution device, the application server that stores a copy (substitute application) identical to the requested application can run the application in response to an execution request from the client terminal, and the resulting output data can be acquired from the application server. The application server can therefore be used as a substitute application execution device, and the system can be built at a lower cost than providing an additional application execution device.

Furthermore, because the execution request from the client terminal to the application execution device is automatically switched to a substitute execution request applied to the application server when there is a problem with the application on the application execution device, it is not necessary to quit the application and reset the execution request address of the client terminal every time there is a problem with the application on the application execution device. The client terminal can therefore get the result of running the application without even knowing that an application error occurred. An "application" as used here refers to an application program and a database that is used by the application program. An error or error state as used herein refers to any condition that is not normal, such as when there is no response to a polling signal sent regularly to the application.

Variations of the invention are described below.

In the application execution system according to another aspect of the invention the application execution device sends synchronization data including account information and session information for the application to the application server. Based on the received application synchronization data, the application server updates the substitute application.

In this aspect of the invention the application execution device also executes a step of sending synchronization data including account information and session information for the application to the application server, and the application server executes a step of updating the substitute application based on the received application synchronization data.

This aspect of the invention enables the application server to synchronize with the application execution device using the synchronization data sent from the application execution device. As a result, the client terminal can get the same result from the application server as when the application execution device runs the application. The application server can also be used as a backup server for the application execution device, and the system can be deployed at a lower cost than when a separate backup device is provided for the application execution device.

Further preferably, the synchronization data is sent for the application according to an application execution request from the client terminal when the status of the application is normal.

Because a backup is created on the application server every time an execution request is received from the client terminal when the application is normal, this aspect of the invention can quickly recover and continue running the application because there is little data to recover when an error occurs with the application on the application execution device.

Yet further preferably, the application synchronization data is sent when an error is detected.

Because the application server is synchronized with the application execution device when the application server runs the application, this aspect of the invention enables the client terminal to reliably get the same result from the application server as when the application execution device runs the application.

Yet further preferably, the application server sends synchronization data including account information and session information for the substitute application to the application execution device. Based on the received synchronization data for the substitute application, the application execution device updates the application.

Yet further preferably, the synchronization data for the substitute application includes upgrade data or a software patch for the application.

This aspect of the invention enables the application execution device to synchronize with the application server using the synchronization data sent from the application server. As a result, when the application server runs the application instead of the application execution device, the application execution device can be used as a backup server for the application server.

Furthermore, sending upgrade data or software patches from the application server enables remote maintenance of the application on the application execution device. For example, if there is a bug with the application on the application execution device, a patch could be sent to the application execution device to fix the problem. Upgrade data could also be sent to add new function to the application and upgrade the application.

Yet further preferably, the application execution device also requests the same application as the substitute application from the application server when there is a change from the error state to normal state, and stores the application that was acquired in response to the request.

In this case when there is a change from the error state to normal state, the application execution device executes a step of requesting the same application as the substitute application from the application server, and stores the application that was acquired in response to the request.

When the application on the application execution device is recovered, this aspect of the invention enables the application execution device to continue from the same environment as the application server that took over when the application error occurred on the application execution device. The client terminal can therefore get the result from the application without knowing about the application error.

Yet further preferably, the application execution device configures the environment or monitoring the status of the application using a client terminal-side operation.

This aspect of the invention enables configuring the environment or monitoring the status of the application from the client terminal, and enables manufacturing the application execution device at a lower cost than if an input device or output device is provided for the application execution device. "Configuring the environment" as used herein means setting access rights and authentication settings for each user.

The invention can also be formed as described below.

An application execution system according to another aspect of the invention is an application execution system that has a client terminal and an application execution device that runs applications based on execution requests from the client terminal connected by a second network, and has the application execution device connected to a substitute server (application server) that can execute the application instead of the application execution device connected by a first network. The application execution device has an execution unit for running the applications and returning the resulting output data to the client terminal, and a switching unit that operates independently of the execution unit. The switching unit determines if the execution unit can run the application, receives execution requests from the client terminal, and passes the received execution request to the execution unit when the execution unit can run the application, and passes the received execution request to the application server when the execution unit cannot run the application. The substitute server stores a substitute application that is identical to the served application, and executes the substitute application and returns the resulting output data to the client terminal based on the substitute execution request.

A control method for an application execution system according to another aspect of the invention is a control method for an application execution system that has a client terminal and an application execution device connected by a second network, and has the application execution device connected to a substitute server (application server) that can execute the application instead of the application execution device connected by a first network. The application execution device has an execution unit that runs applications based on execution requests from the client terminal, and a switching unit that operates independently of the execution unit.

The execution unit executes a step of running the applications and returning the resulting output data to the client terminal. The switching unit executes steps of determining if the execution unit can run the application, receiving execution requests from the client terminal, and passing the received execution request to the execution unit when the execution unit can run the application and passing the received execution request to the application server when the execution unit cannot run the application.

The substitute server executes steps of storing a substitute application that is identical to the served application, and executing the substitute application and returning the resulting output data to the client terminal based on the substitute execution request.

When the first network is the Internet and the second network is a LAN, the client terminal can get the result of running an application by accessing an application execution device connected to the LAN instead of over the Internet. The application can therefore be run in a stable environment without being affected by the Internet connection.

This aspect of the invention divides the application execution device into an execution unit that primarily executes the application and a switching unit that primarily handles data transfers, operates these units separately and thereby distributes the overall processing load of the application execution device. This reduces the heat output of the CPU, for example, and thus reduces the failure rate of the application execution device. In addition, because the processing load of the switching unit is generally less than that of the execution unit, switching unit failures can be minimized and system stability can be improved.

Furthermore, if the execution unit of the application execution device cannot run the application (because of a hardware failure, for example), the switching unit can pass the execution request from the client terminal to the application server, which stores a substitute application identical to the requested application, because the switching unit operates independently of the execution unit, and the result of executing the application (the output data) can be acquired from the substitute server.

In addition, because execution requests from the client terminal to the application execution device are automatically transferred to the substitute server if the execution unit of the application execution device fails, the address to which execution requests are sent does not need to be changed on the client terminal every time a problem occurs in the execution unit. The client terminal can therefore get the result of running the application without being aware of the problem with the execution unit.

In addition, because the switching unit is inside the application execution device, less space is required compared with an arrangement having the switching unit rendered in a separate device.

An "application" as used here refers to an application program and a database that is used by the application program. An error state or state in which the application cannot be executed as used herein includes an execution unit failure, a power off state, the temperature of the CPU exceeding the operating temperature range, insufficient memory, or the operating voltage being below the required operating voltage, for example.

The substitute server preferably also delivers applications to the application execution device.

This aspect of the invention enables the substitute server to also function as an application server for serving applications to the application execution device, and enables deploying the system at a lower cost than providing a separate additional application server.

Further preferably, the execution unit includes an execution unit power supply circuit for supplying power to the execution unit, and the switching unit includes a switching unit power supply circuit for supplying power to the switching unit.

Because the execution unit and the switching unit in this aspect of the invention each has its own power supply circuit, power can be supplied to the switching unit even if the execution unit power supply circuit fails when the power is supplied from a single power source, and the client terminal can get the execution result from the substitute server.

Further preferably, the application execution device also has an execution unit power supply for supplying power to the execution unit through the execution unit power supply circuit, and a switching unit power supply for supplying power to the switching unit through the switching unit power supply circuit.

Because the application execution device has a separate power supply for the execution unit and the switching unit, power can be supplied to the switching unit even if the power supply for the execution unit fails, and the client terminal can get the execution result from the substitute server.

Yet further preferably, the switching unit authenticates the client terminal that can run the application, and forwards the execution request only when authentication succeeds.

With this aspect of the invention the switching unit will not forward an execution request to any client terminal other than the client terminal for which authentication succeeds, and thus improves security. Furthermore, because which applications can be executed can be controlled individually for each client terminal, specific client terminals can be dedicated to specific tasks.

A switching device according to another aspect of the invention functions as the switching unit used in the foregoing application execution system.

The invention can also be formed as follows.

The application execution system according to another aspect of the invention is an application execution system that has a client terminal and an application execution device that executes an application based on an execution request from the client terminal connected by the second network through a gateway that relays data, and has the gateway and a substitute server that executes the application instead of the application execution device (application server) connected by the first network.

The client terminal specifies the application to run and sends the execution request to the gateway.

The gateway references a database storing application storage addresses, and determines if the specified application is stored on the application execution device; determines if the application execution device can run the application; changes the execution request address to the application execution device if the specified application is stored on the application execution device and the application execution device can run the application, and changes the execution request address to the substitute server if the specified application is not stored on the application execution device or the application execution device cannot run the application, when an execution request is received from the client terminal, and sends the execution request to the changed execution request address.

The application execution device runs the application based on execution requests from the gateway, and returns the resulting output data through the gateway to the client terminal.

The substitute server runs the application based on an execution request from the gateway, and returns the execution result through the gateway to the client terminal.

The control method of an application execution system according to another aspect of the invention is a control method for an application execution system that has a client terminal and an application execution device that executes an application based on an execution request from the client terminal connected by the second network through a gateway that relays data, and has the gateway and a substitute server that executes the application instead of the application execution device connected by the first network.

The client terminal executes a step of specifying the application to run and sending the execution request to the gateway.

The gateway executes steps of: referencing a database storing application storage addresses and determining if the specified application is stored on the application execution device; determining if the application execution device can run the application; changing the execution request address to the application execution device if the specified application is stored on the application execution device and the application execution device can run the application, and changing the execution request address to the substitute server if the specified application is not stored on the application execution device or the application execution device cannot run the application, when an execution request is received from the client terminal; and sending the execution request to the changed execution request address.

The application execution device executes a step of running the application based on execution requests from the gateway, and returning the resulting output data through the gateway to the client terminal.

The substitute server executes a step of running the application based on an execution request from the gateway, and returning the execution result through the gateway to the client terminal.

When the first network is the Internet and the second network is a LAN, the client terminal can get the result of running an application by accessing an application execution device connected to the LAN instead of over the Internet. The application can therefore be run in a stable environment without being affected by the quality of the Internet connection.

In this aspect of the invention the client terminal simply specifies the desired application and sends an execution request to the gateway. The gateway then automatically converts the execution request addressed to the gateway to the server that stores the application. The client terminal (user) can thus get the result of running the application without knowing where the application is stored. By thus locating the client terminal behind a gateway, the server can be hidden from the client terminal and a flexible network can be constructed. For example, when a server is added or replaced, a setting on the gateway can simply be added or changed and the system can be easily changed because the client terminal continues to access the same device.

If the application is not stored on the application execution device or there is a problem with the application execution device, the gateway automatically changes the address of the execution request to an external server. The address to which the client terminal sends an execution request therefore does not need to be changed whenever a problem occurs.

An "application" as used here refers to an application program and a database that is used by the application program. An error state or state in which the application cannot be executed as used herein includes an execution unit failure, a power off state, the temperature of the CPU exceeding the operating temperature range, insufficient memory, the operating voltage being below the required operating voltage, or the response time for the execution result from the application being too long, for example.

The substitute server preferably delivers applications to the application execution device.

This aspect of the invention enables the substitute server to also function as an application server for serving applications to the application execution device, and enables deploying the system at a lower cost than providing a separate additional application server.

The application execution system according to another aspect of the invention also has a gateway server that is connected to the gateway through the first network, and relays data between the gateway and the substitute server.

The gateway sets the gateway of the execution request address to the application execution device by encapsulating the execution request when the address of the application execution request changes to the application execution device, and sets the gateway of the execution request address to the gateway server by encapsulating the execution request when the address of the application execution request changes to the gateway server; and decapsulates and sends the received output data to the client terminal.

The application execution device decapsulates the execution request from the gateway, runs the application, and encapsulates and sends the resulting output data to the gateway.

The gateway server decapsulates and forwards the execution request from the gateway to the substitute server, and encapsulates and forwards the resulting output data from the substitute server to the gateway.

The substitute server runs the application based on the execution request forwarded from the gateway server, and sends the resulting output data to the gateway server.

This aspect of the invention improves the security between devices that communicate by means of encapsulated communication. For example, if the first network is the Internet and the second network is an in-house LAN, data theft and unauthorized access can be prevented from communication on the in-house LAN and the Internet. Encapsulation as used herein is a technology for wrapping original data (such as packets to the substitute server) in a new data message (such as packets to the gateway server).

In this case the gateway to which the execution request is sent is specified and authentication information is added to the execution request. The application execution device also authenticates the execution request based on the authentication information, and allows running only the applications of execution requests for which authentication succeeds.

Further preferably, the application execution system also has an authentication server that is connected by the first network to the gateway server and authenticates execution requests. The gateway specifies the execution request address and adds authentication information to the execution request. The gateway server authenticates execution requests from the gateway using the authentication server when decapsulating the execution requests. The application server allows running the application only when authentication of the execution request by the authentication server succeeds.

This aspect of the invention prevents unauthorized access to the application execution device when the application execution device can execute the application, prevents unauthorized access to the substitute server when the application execution device cannot execute the application, and thus improves security. What applications can be executed can thus be controlled for each client terminal.

Other objects of the present invention are met in an application execution system comprising: an application server configured to store an application execution set comprising an application program and a database, and comprises: a first memory store configured to store a first copy of the application execution set as a substitute application execution set that is identical to the first application execution set; and a first processing unit set as a server processing unit configured to execute the substitute application execution set; an application execution device connected to the application server by an internet network, configured to run a second copy of the first application execution set, and comprises: a second memory store configured to store the second copy of the first application execution set; a communication interface configured to receive an execution request requesting execution of the first application execution set; and a second processing unit configured to detect if the execution of the second copy of the application execution set is normal or has an error; a client terminal connected to the application execution device by a local network and connected to the application server by the internet network, configured to send the execution request to the application execution device through the local network; wherein, in response to receipt of the execution request from the client terminal, the application execution device executes the second copy of the application execution set and sends resulting output data to the client terminal when the processing unit determines that execution of the second copy of the application execution set is normal; wherein the application execution device sends through the internet network a substitute execution request requesting execution of the substitute application execution set to the application server when the processing unit detects an error; and wherein the server processing unit executes the substitute application execution set based on the substitute execution request and sends resulting output data directly to the client terminal through the internet network.

In this approach, the second processing unit preferably sends synchronization data including application account information and session information of the second copy of the application execution set to the application server; and the application server updates the substitute application execution set based on the received synchronization data.

Also preferably, the server processing unit sends synchronization data including account information and session information of the substitute application execution set to the application execution device; and the application execution device updates the second copy of the application execution set based on the received synchronization data.

Objects of the present invention are also met in a control method for an application execution system having an application server that stores an application execution set comprising an application program and a database, an application execution device that runs the application execution set acquired from the application server and that includes a processing device configured to detect if execution of the acquired application execution set is normal or has an error, and a client terminal that sends an execution request requesting execution of the application execution set by the application execution device, the method comprising; the client terminal sending the execution request to the application execution device via a local network; the application execution device receiving the execution request from the client terminal via the local network; wherein, when the processing unit determines that execution of the application execution set by the application execution device failed, the method further comprises: the application execution device sending a substitute execution request requesting execution of the application execution set to the application server via an internet network; in response to receipt of the substitute execution request, the application server executing a copy of the application execution set; and the application server sending resulting output data directly to the client terminal via the internet network.

Objects of the present invention are further met in an application execution system comprising: an application server having a first memory store housing a plurality of application-execution sets, each application-execution set including a respective application program and any database needed for execution of the respective application program, said application server being further configured to provide a separate first execution-environment within said first memory store for execution of any of said plurality of individual application-execution sets upon request, each first execution-environment including an allotment of computing resources necessary for execution of its respective application-execution set on said application server; a first gateway providing an authentication-communication interface between said application server and the Internet; an application execution device having a second memory store, and configured to download select application-execution sets from said application server and creating a second execution-environment within its second memory store for each downloaded application-execution set, each second execution-environment including an allotment of computing resources necessary for execution of its respective application-execution set on said application execution device; wherein said application server responds to the downloading of each application-execution set to the application execution device by creating a separate first execution-environment for each downloaded application-execution set; a second gateway having a third memory store housing an application storage table listing the application-execution sets available on said application server and on said application execution device, said second gateway further having a first communication interface connected to a local network and a second communication interface connected directly to said application execution device, said gateway further having access to the Internet; and a client terminal coupled to said second gateway via said local network, said client terminal being configured to request remote execution on said second gateway of a selected one of said application-executions sets by sending to said second gateway a first remote execution request including a first message package having a first message header including a first execution request address addressed to said second gateway and a first message body including a first execution command for the selected application-execution set; wherein said second gateway responds to receipt of the first remote execution request from said client by checking its application storage table to determine the location of the selected application-execution set, and IF the selected execution set is available for execution on said application execution device and the second gateway determines that the application execution device is suitable for execution of the selected execution set, THEN the second gateway creates a second execution request addressed to the application execution device and sends the second execution request to the application execution device, wherein: said second execution request encapsulates the first execution request, the application execution device responds to the second execution request by decapsulating the first execution request, executing the first execution command, and transmitting command execution results to the second gateway, and the second gateway transmits the command execution results received from the application device, to the client device as a response to the client device's first remote execution request; ELSE the second gateway creates a third execution request and sends the third execution request to the first gateway for execution by the application server, wherein: said third execution request encapsulates the first execution request, the first gateway responds to the third execution request by decapsulating the first execution request and sending the first execution request to the application server, and the application server executes the first execution command and transmits command execution results to the second gateway, and the second gateway transmits the command execution results received from the application server to the client device as a response to the client device's first remote execution request.

In this approach, the second execution request preferably includes a second message package having a second message header including a second execution request address addressed to said application execution device and a second message body encapsulating the first remote execution request in full.

Also in this approach, the third execution request may include a third message package having a third message header including a third execution request address addressed to the first gateway and a second message body encapsulating the first remote execution request in full.

Additionally, the application server may transmit the command execution results directly to the second gateway.

Alternatively, the application server may transmit the command execution results to the second gateway via the first gateway.

Additionally, the first gateway may transmit the command execution results to the second gateway by encapsulating the command execution results into the first message body of the first remote execution request to create a modified execution request, and sending the modified execution request to the second gateway.

Preferably, the first gateway is a gateway server.

Further preferably, the application execution device transmits the command execution results to the second gateway by encapsulating the command execution results into the first message body of the first remote execution request to create a modified execution request, and sending the modified execution request to the second gateway.

This approach may further have a management server configured monitor the application server and inform the second gateway of the locations of application-execution sets.

Preferably the second gateway determines that the application execution device is suitable for execution of the selected execution set if the hardware conditions of the application execution device meet preset minimum hardware requirements.

In this case, the minimum hardware requirements may include the operating temperature the application execution device's CPU, the usage availability of the application execution device's CPU, usage availability of the application execution device's RAM, the operating voltage of the application execution device, and the fan speed of at least on fan within application execution device.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 16A, 16B, and 16C show an example of the application storage table in the third embodiment of the invention.

DESCRIPTION OF THE PREFERRED EMBODIMENTS

Preferred embodiments of an application execution system, computer, an application execution device, and a control method and a program for an application execution system according to the present invention are described below with reference to the accompanying figures. When an application program cannot run on an application server connected to the user's LAN, the invention enables the server that provides the application program to run the application over the Internet instead of on the local application server.

Figure 1:
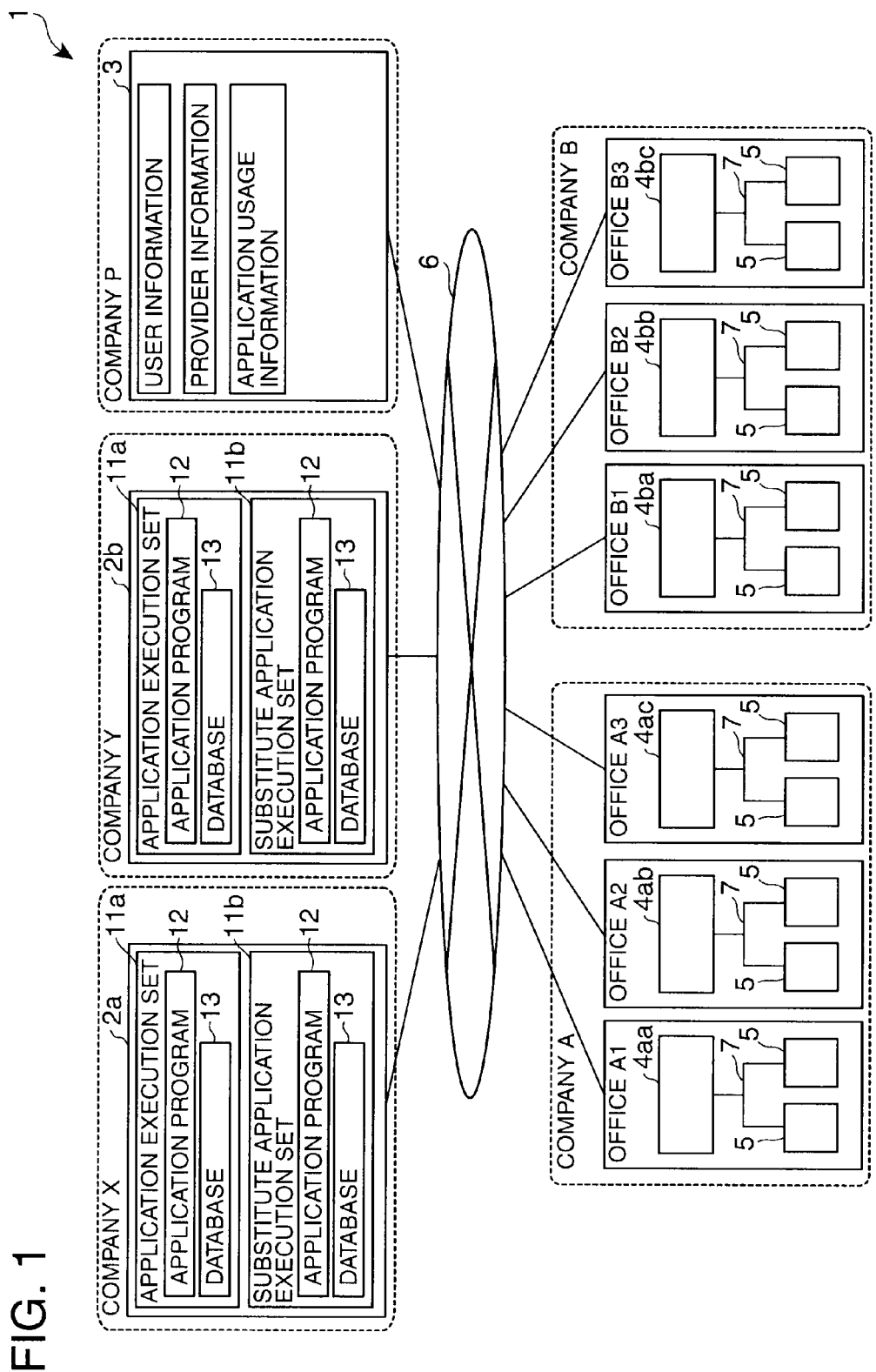
FIG. 1 is a system diagram of the application execution system according to a first embodiment of the invention.

The arrangement of an application execution system 1 according to a first embodiment of the invention is described next with reference to the system diagram in FIG. 1.

The application execution system 1 according to this embodiment of the invention includes a plurality of application servers 2a and 2b, which are owned by a plurality of vendors (company X and company Y), and a single management server 3 that is owned by the platform manager (company P) that operates the application execution system 1 connected over the Internet 6 to a plurality of application execution devices 4aa, 4ab, 4ac, 4ba, 4bb, 4bc. The application servers 2a and 2b serve (i.e. store and deliver) application execution sets 11a (applications), each including an application program 12 and at least one database 13 that is used when executing the application program 12. The application execution devices 4aa, 4ab, 4ac, 4ba, 4bb, 4bc (referred to as the application execution devices 4 below unless identifying a particular device is necessary) are located in the offices A1, A2, A3, B1, B2, B3 of the plural users (company A and company B) that use the application execution sets 11a. In addition, the application execution devices 4 are typically connected over an in-house LAN 7 (second network) to two or more client terminals 5, which ask the application execution device 4 to execute the application execution sets 11a.

The management server 3 is located in the data center of company P, for example, and functions as the reception center through which an application provider (application servers 2) makes an application execution set 11a available to users (application execution devices 4).

The user gets information stored on the management servers 3 about the plural application execution sets 11a (such as the address of the application server 2), and based on this information gets the desired application execution set 11a from the application server 2. This enables the user to easily search for application execution sets 11a and enables increasing the selection of application execution sets 11a. The management server 3 also gets information about application execution set 11a usage from the users, and based on this information manages information about payments to the application providers (application servers 2).

The application execution devices 4 are located in the business offices, for example, of the users, and based on the application requests from the local client terminals 5 download and execute the application execution sets 11a from the application servers 2. More specifically, the application execution device 4 functions as a server in a server-based computing (SBC) service such as a co-location service or hosting service. This enables the individual client terminals 5 to get the result of running an application execution set 11a without locally installing the application execution set 11a. Furthermore, because the client terminals 5 can get the result of running the application execution set 11a by accessing a application execution device 4 connected to an in-house LAN 7 instead of accessing a server over the Internet 6, the application execution set 11a can be run in a stable environment without being affected by the Internet connection once it has been downloaded from the application server to the application execution device.

In addition to delivering application execution sets 11a in response to requests from an application execution device 4, the application server 2 returns the execution result to the client terminal 5 instead of the application execution device 4 when a problem occurs while executing the application execution set 11a on the application execution device 4. In this case the application server 2 stores a substitute application execution set 11b that is identical to the application execution set 11a run by the application execution device 4, and returns the same output result by running the identical substitute application execution set 11b. The application server 2 can therefore also function as a substitute application execution device, and thus enables constructing a system at a lower cost than providing a separate new server as the substitute application execution device.

In addition, the application programs 12 may be created in different development environments by different vendors, and the databases 13 are written for each application program 12.

Controlling the components (application servers 2, management server 3, application execution devices 4, and client terminals 5) of the application execution system 1 according to this embodiment of the invention is described next with reference to FIG. 2.

The application execution device 4 has a communication interface 21, an I/O interface 22, an internal bus 23, a CPU 24 (central processing unit), ROM 25 (read-only memory), RAM 26 (random-access memory), and a hard disk drive 27. A control program 31 and management tool 33 are stored in ROM 25, and a plurality of execution environments 32 that are built for executing an application execution set 11a are stored in the hard disk drive 27.

Figure 3:
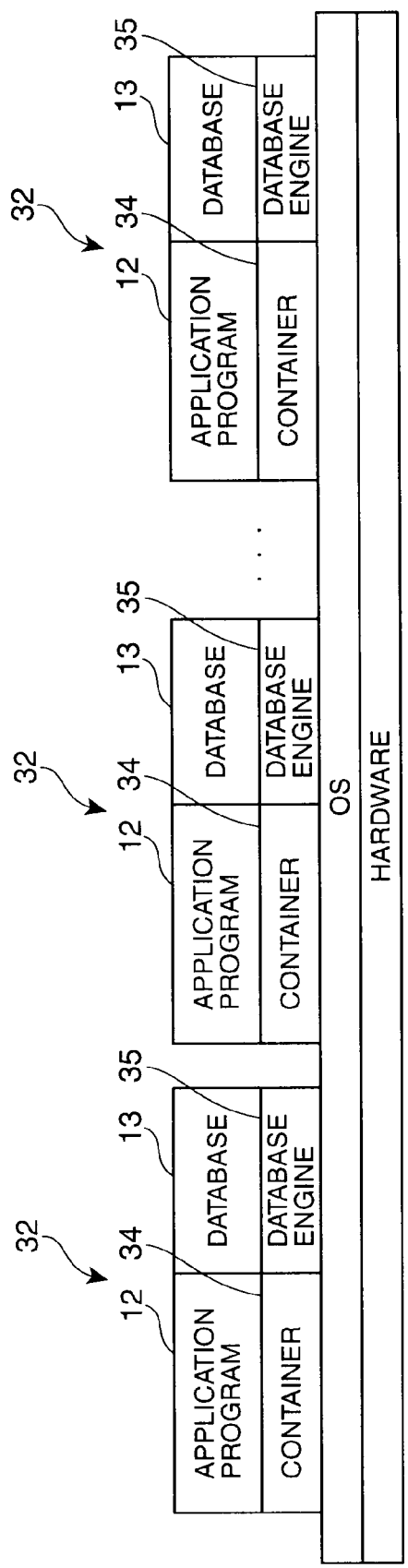
FIG. 3 schematically illustrates the application execution environment of the application execution device in the first embodiment of the invention.

The execution environment 32 is constructed for each application execution set 11a, and includes a container 34 that is the operating environment for running the application program 12, and a database engine 35 for accessing the database 13 when using the application program 12 (see FIG. 3). Resources such as a working area in RAM 26 is also allocated to each execution environment 32 so that if a memory leak occurs, for example, an application execution set 11a in another execution environment 32 will not be affected and operation will not stop.

The control program 31 regularly detects the status of the application execution set 11a, and controls execution of the application execution set 11a, the synchronization process, and recovery process using the CPU 24 based on the detected execution status. A CPU operating under control of a control program will be referred to herein as a "processing unit." The status of application execution set 11a execution can be detected, for example, by including a status response program that returns the status of the application execution set 11a so that the CPU 24 can detect the status of the application execution set 11a based on the response to a signal that is sent according to a status request program built into the control program 31. The CPU 24 determines operation is normal if a response signal is returned by the status response program, and detects an error if a response signal is not received. Status detection is not limited to this method, however, and a background application could be used to actually detect if the application execution set 11a can run.

When the CPU 24 determines that the application execution set 11a can be executed and receives an execution request for the application execution set 11a from the client terminal 5, the CPU 24 runs the application execution set 11a and sends the result to the client terminal 5.

However, if CPU 24 receives an execution request for the application execution set 11a from the client terminal 5 after detecting an application execution set 11a error, the CPU 24 sends a substitute execution request to the application server 2.

The application execution device 4 also synchronizes with the application server 2 and sends synchronization data including account information and session information for the application execution set 11a to the application server 2.

If the CPU 24 determined that the application execution set 11a can execute, the CPU 24 sends the synchronization data to the application server 2 in response to the application execution set 11a execution request from the client terminal 5. Because synchronization data is sent to the application server 2 and a backup is made each time an execution request is received from the client terminal 5, there is little data that requires recovering and the application execution set 11a can be restored in a short time if the application execution set 11a crashes on the application execution device 4.

The CPU 24 sends the synchronization data to the application server 2 whenever the CPU 24 detects an error in the application execution set 11a. Synchronization between the application server 2 and the application execution device 4 is thus maintained when the application server 2 is executing the application set, and the client terminal 5 can therefore get the same result from the application server 2 that would be returned when the application execution device 4 executes the application execution set 11a.

Based on the received synchronization data, the application server 2 updates the substitute application execution set 11b disposed in the 52 described further below and synchronizes with the application execution device 4. The application server 2 can thus be used as a backup server for the application execution device 4 and the system can be deployed at a lower cost than a system having a separate backup device added to the in-house LAN 7.

The account information as used herein is used for authentication settings and to permit executing the application execution set 11a, and includes the group name of the user, the username, and password.

Session information is used to assure the continuity of the execution process on the application server 2 when an application execution set 11a error occurs, and includes a session ID, a session valid/invalid flag, the maximum session interrupt time, the last access time of the session, the name of the application execution set of the session, and the updated data from the session.

In order to execute the recovery process when the CPU 24 detects a change from the application execution set 11a error state to normal execution state, the application execution device 4 again gets the same application execution set 11a as the substitute application execution set 11b from the application server 2. More specifically, when a request to again get the application execution set 11a is asserted from the application execution device 4, the CPU 24 copies and sends the substitute application execution set 11b from the substitute execution environment 52 of the application server 2 to the application execution device 4. The application execution device 4 then stores the reacquired application execution set 11a in the execution environment 32 in an area of the hard disk storage device. When the application execution set 11a of the application execution device 4 recovers, the application execution device 4 can take over the environment of the application server 2 that continued executing the application execution set 11a when the application execution set 11a encountered an error on the application execution device 4. The client terminal 5 can thus get the result of executing the application execution set 11a without being aware of recovering from the application execution set 11a error.

The management tool 33 is operated from the client terminal 5 to configure the environment and monitor the status of the application execution set 11a. Configuring the environment as used herein refers to giving permission to execute the application execution set 11a and configuring the authentication settings. Permission is given by setting the group name or username that can execute the application execution set 11a for each application execution set 11a. The authentication setting is configured by setting the username and password for each application execution set 11a. Because the execution environment can be configured and the status can be monitored from the client terminal 5, it is not necessary to provide an input/output device on the application execution device 4 and the application execution device 4 is thus simplified.

Figure 2:
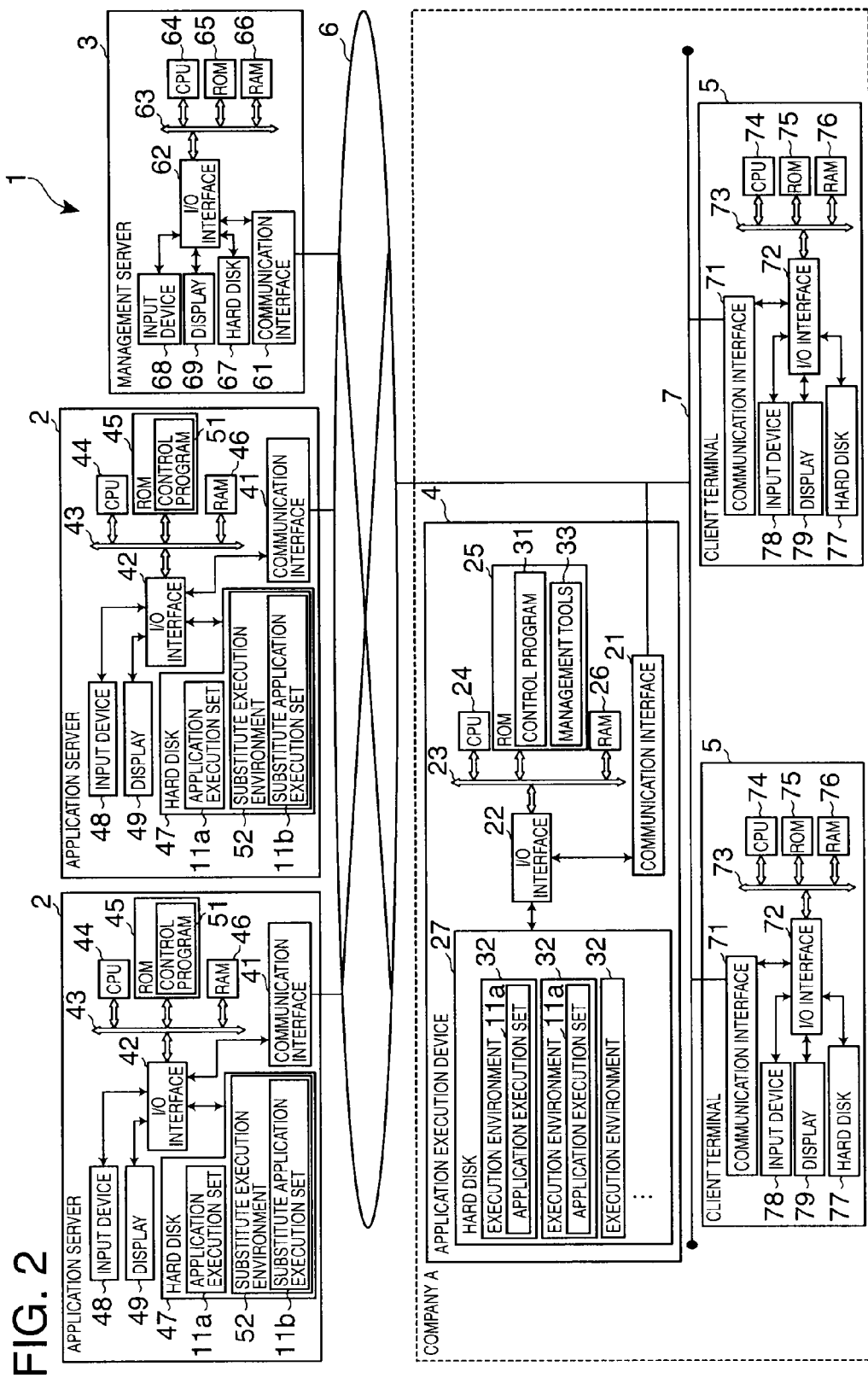
FIG. 2 shows the control arrangement of the application execution system according to the first embodiment of the invention.

Referring to FIG. 2, he application server 2 includes an input device 48, a display 49, a communication interface 41, an I/O interface 42, an internal bus 43, a CPU 44, ROM 45, RAM 46, and a hard disk drive 47. A control program 51 is stored in the ROM 45. The application execution set 11a that is delivered to the application execution device 4, a substitute application execution set 11b that is identical to and can be executed instead of the application execution set 11a, and the substitute execution environment 52 of the substitute application execution set 11b are stored on the hard disk drive 47 (i.e. storage device).

The control program 51 is run by the CPU 44 to control distribution of the application execution set 11a, the substitute execution process, and the synchronization process. In the application execution set 11a distribution process the CPU 44 distributes the application execution set 11a stored on the hard disk drive 47 in response to a request from the application execution device 4. In conjunction with sending the application execution set 11a to the application execution device 4, the CPU 44 also copies the output application execution set 11a as substitute application execution set 11b on the hard disk drive 47, and stores the copied substitute application execution set 11b in the substitute execution environment 52 in the hard disk storage device.

If an error occurs in the application execution set 11a on the application execution device 4 and a substitute execution request is received from the application execution device 4, the CPU 44 runs the substitute application execution set 11b in the substitute execution environment 52 and returns the result to the client terminal 5. The result can be returned through the application execution device 4 to the client terminal 5 or directly to the client terminal 5.

The application server 2 is synchronized with the application execution device 4 and the CPU 44 sends the synchronization data including account information and session information to the application execution device. Based on this synchronization data the application execution device 4 updates the application execution set 11a stored on the hard disk drive 27 and synchronizes with the application server 2. As a result, when the application server 2 is executing the substitute application execution set 11b, the application execution device 4 can be used as a backup server for the application server 2.

The application server 2 can remotely maintain the application execution device 4 by sending synchronization data including upgrade data and patch data to the application execution device 4. For example, when an error occurs in the application execution set 11a of the application execution device 4, a software patch can be sent to the application execution device 4 to resolve the problem. In addition, if a new function is added to the application execution set 11a, upgrade data can be sent to upgrade the application execution set 11a.

The management server 3 (reference numerals 61 to 69) and the client terminal 5 (reference numerals 71 to 79) have the same hardware configuration as the application server 2 and further description thereof is thus omitted. Note that the client terminal 5 is not limited to a personal computer and could be a printer such as a receipt printer or a portable data terminal, for example.

Figure 4:
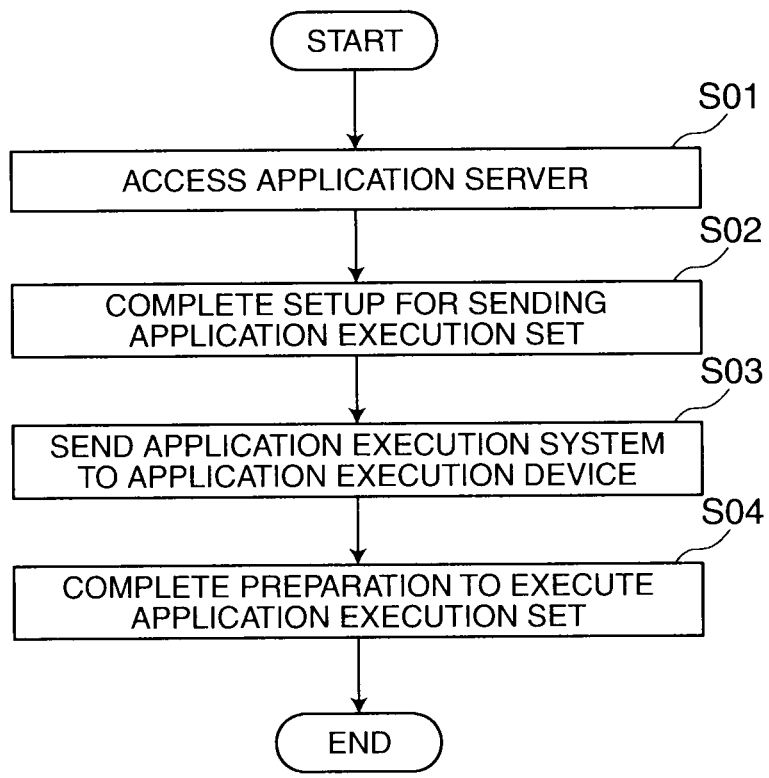
FIG. 4 is a flow chart of the application execution set acquisition process in the application execution system according to the first embodiment of the invention.

The application execution set 11a acquisition process, the normal execution process, the process executed when an error occurs, and the recovery process of the application execution system 1 are described next. The application execution set 11a acquisition process is described first with reference to the flow chart in FIG. 4.

Based on a download request from the client terminal 5, the application execution device 4 accesses the URL of the application server 2 that stores the desired application execution set 11a (S01). The application server 2 then copies the application execution set 11a to create and write the substitute application execution set 11b to the substitute execution environment 52, and completes preparing to send the application execution set 11a (S02). The application server 2 then sends the application execution set 11a to the application execution device 4 (S03). The application execution device 4 writes and starts the received application execution set 11a in the execution environment 32, and completes preparing to run the application execution set 11a (S04).

Figure 5:
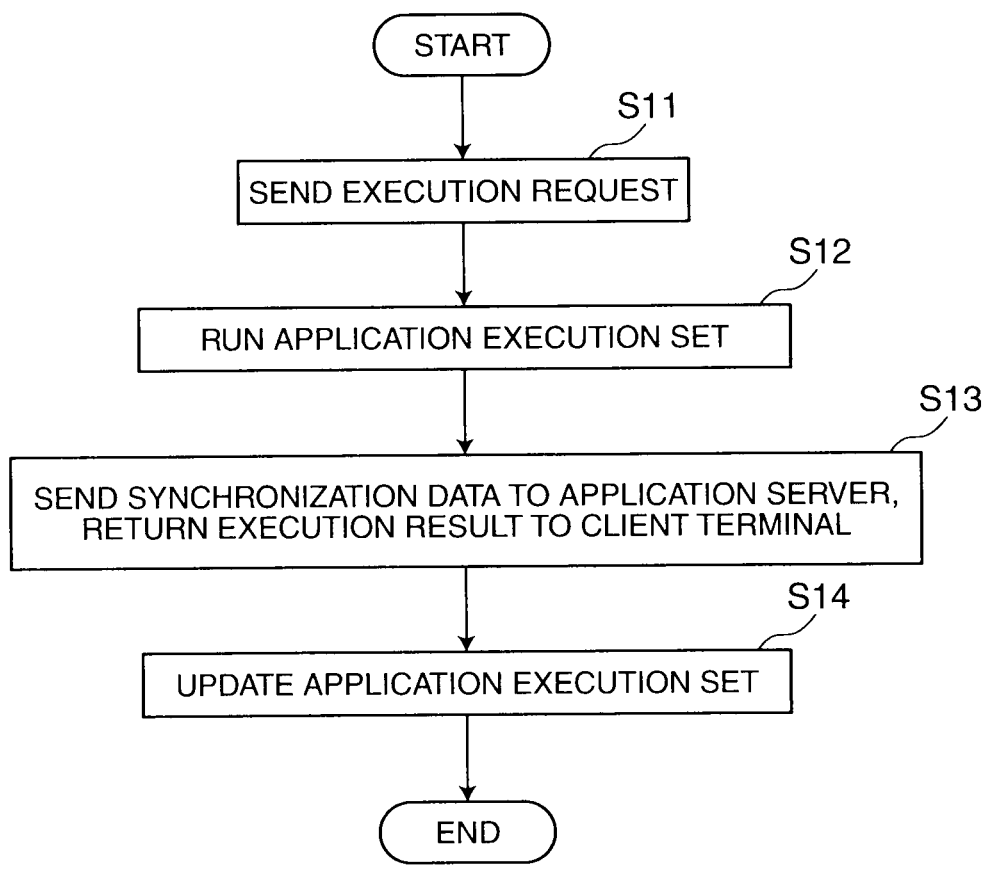
FIG. 5 is a flow chart of the normal application execution set execution process in the application execution system according to the first embodiment of the invention.

Normal execution of the application execution set 11a on the application execution system 1 is described next with reference to the flow chart in FIG. 5.

If the application execution device 4 determines the application execution set 11a is normal and receives an application execution set 11a execution request from the client terminal 5 (S11), the application execution device 4 runs the application execution set 11a (S12). The application execution device 4 sends synchronization data that is changed by running the application execution set 11a to the application server 2 and returns the result to the client terminal 5 (S13). Based on the received synchronization data the application server 2 then updates the substitute application execution set 11b (S14). The application execution device 4 thus resynchronizes every time the application execution set 11a is run.

Figure 6:
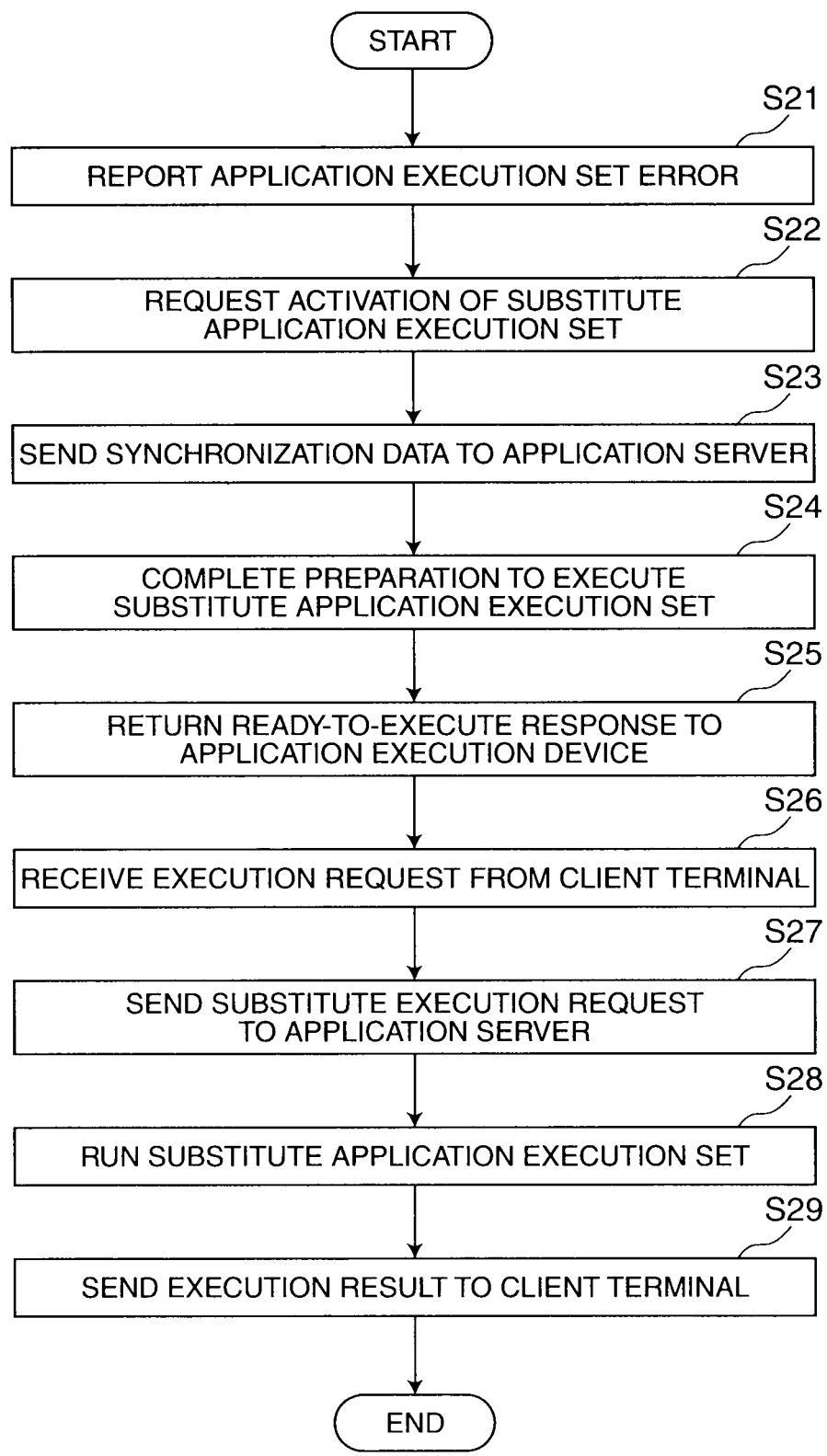
FIG. 6 is a flow chart of the application execution set execution process when an error occurs in the application execution system according to the first embodiment of the invention.

Execution when an error occurs in the application execution set 11a on the application execution system 1 is described next with reference to the flow chart in FIG. 6.

If the application execution device 4 detects an error in the application execution set 11a (S21), the application execution device 4 sends an activate request for the substitute application execution set 11b to the application server 2 (S22). The application execution device 4 then sends the unprocessed synchronization data to the application server 2 (S23). Based on the received synchronization data, the application server 2 updates and starts the substitute application execution set 11b and completes preparing to run the substitute application execution set 11b (S24). When this preparation is finished, the application server 2 returns a preparation completion report to the application execution device 4 (S25).

When the client terminal 5 then requests the application execution device 4 to run the application execution set 11a (S26), the application execution device 4 asserts a substitute execution request for the substitute application execution set 11b to the application server 2 (S27). Based on this substitute execution request the application server 2 runs the substitute application execution set 11b (S28), returns the result to the application execution device 4, and the application execution device 4 forwards the received result to the client terminal 5 (S29).

Figure 7:
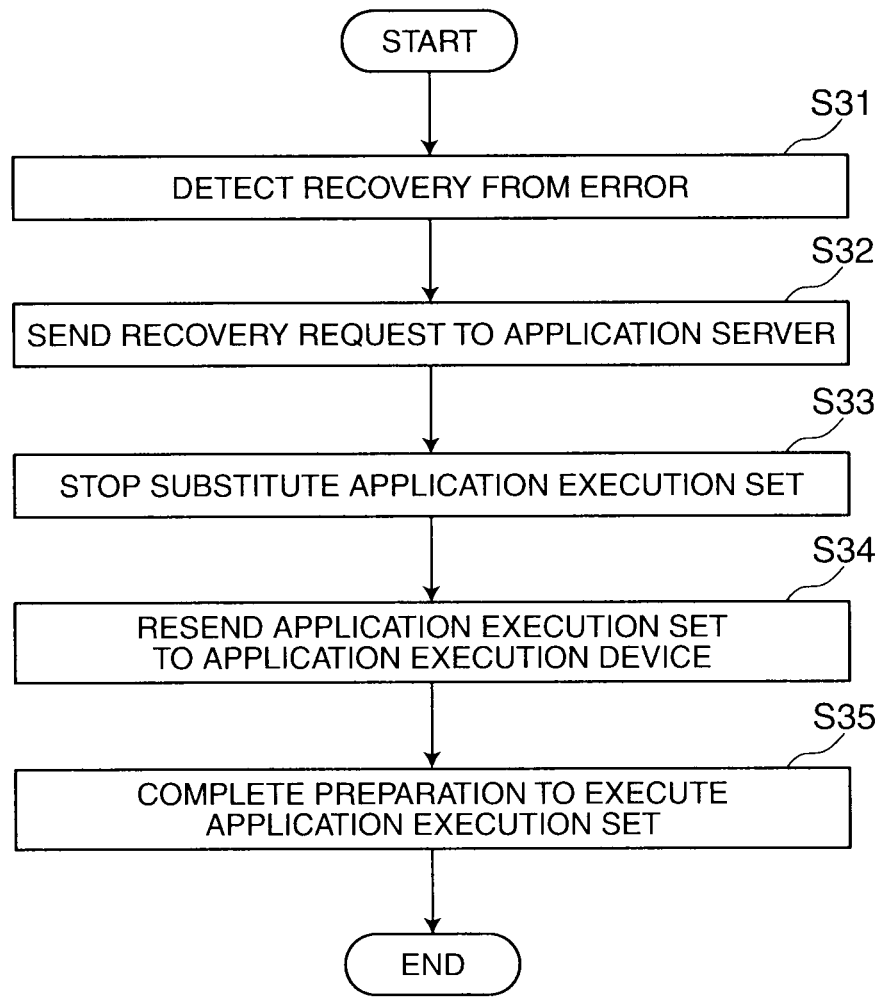
FIG. 7 is a flow chart of the application execution set recovery process in the application execution system according to the first embodiment of the invention.

The application execution set 11a recovery process of the application execution system 1 is described next with reference to the flow chart in FIG. 7.

When the application execution device 4 detects that the application execution device 4 has changed from the error state to the normal operating state (S31), the application execution device 4 asserts a recovery request to the application server 2 (S32). When this recovery request is received the application server 2 stops executing the substitute application execution set 11b (S33). The application server 2 then copies the substitute application execution set 11b and resends the copy as the application execution set 11a to the application execution device 4 (S34). The application execution device 4 then writes and starts the application execution set 11a in the execution environment 32 and completes preparation for executing the application execution set 11a (S35).

When an error occurs with the application execution set 11a of the application execution device 4, this first embodiment of the invention causes the application server 2, which stores a substitute application execution set 11b identical to the application execution set 11a, to execute the substitute application execution set 11b instead of the application execution device 4 and gets the resulting output data of the application execution set 11*a*. The application server 2 can thus be used as a substitute application server, and the system can be constructed at a lower cost than if another application execution device is provided.

Furthermore, if a problem occurs running the application execution set 11*a* on the application execution device 4, execution requests from the client terminal 5 to the application execution device 4 are automatically changed to substitute execution requests sent to the application server 2 so that execution of the application execution set 11*a* is not interrupted whenever a problem occurs with the application execution set 11*a* on the application execution device 4, and there is no need to change the address to which the client terminal 5 sends execution requests. The client terminal 5 can thus get the result returned by the application execution set 11*a* without consciously recognizing the application execution set 11*a* error.

Furthermore, when the application execution device 4 receives application execution sets 11*a* from a plurality of application servers 2, a substitute execution process is executed for each application execution set 11*a*. As a result, an error in one application execution set 11*a* will not interrupt executing other application execution sets 11*a* on the in-house LAN 7.

In addition, because a backup of each application execution set 11*a* is made on the original application server 2, error recovery is easier than when all application execution sets 11*a* are backed up on a single backup server.

A second embodiment of the invention is described next. In this embodiment of the invention the application execution device has an execution unit that primarily runs the application execution set, and a switching unit that primarily handles data transmission.

Figure 8:
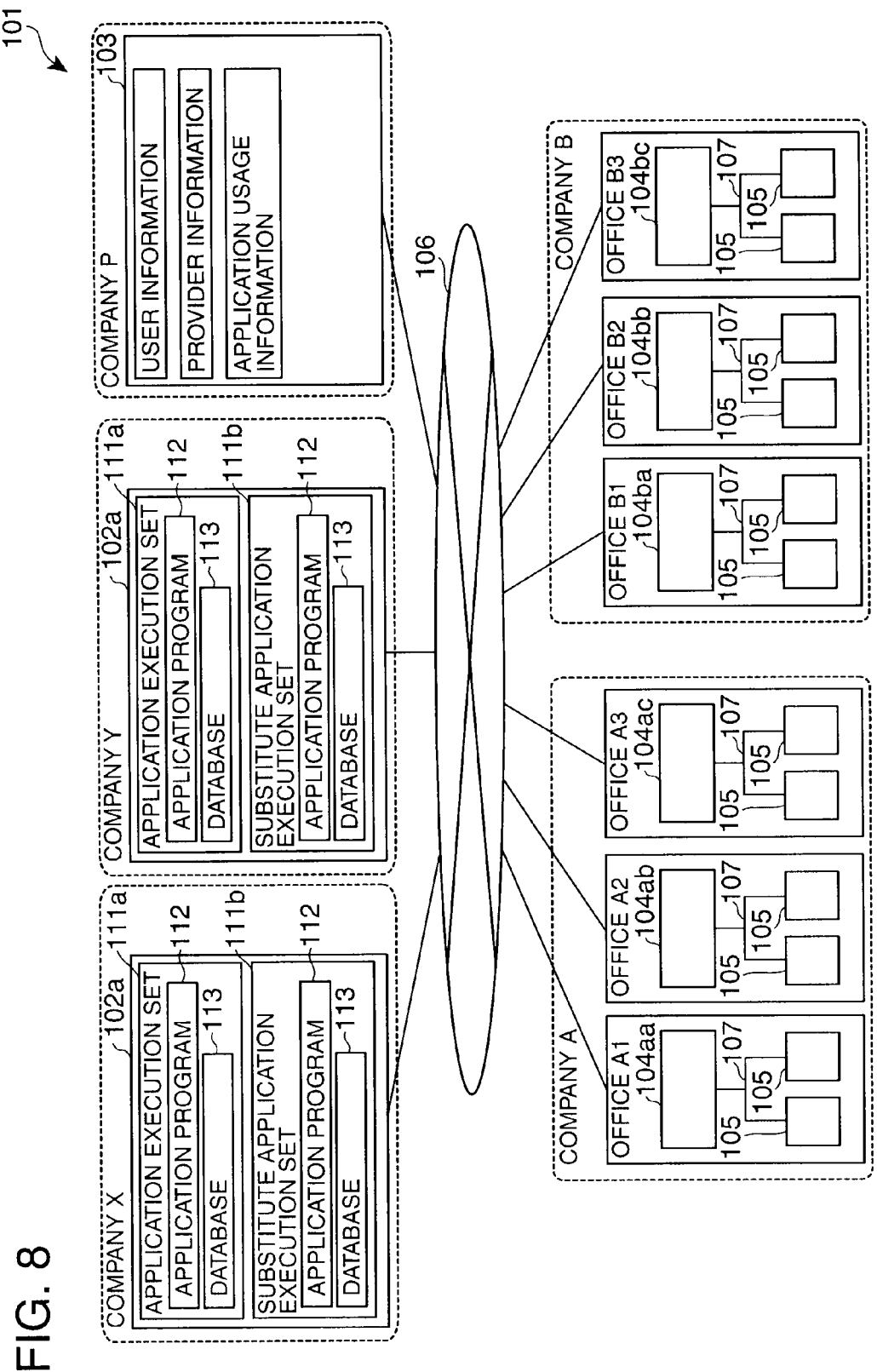
FIG. 8 is a system diagram of the application execution system according to a second embodiment of the invention.

FIG. 8 is a system diagram of the application execution system 101 according to this second embodiment of the invention. The arrangement of the application execution system 101 in this embodiment is substantially identical to the first embodiment and differs from the first embodiment in assigning reference numerals from 100. Further detailed description of like parts is therefore omitted below.

Figure 9:
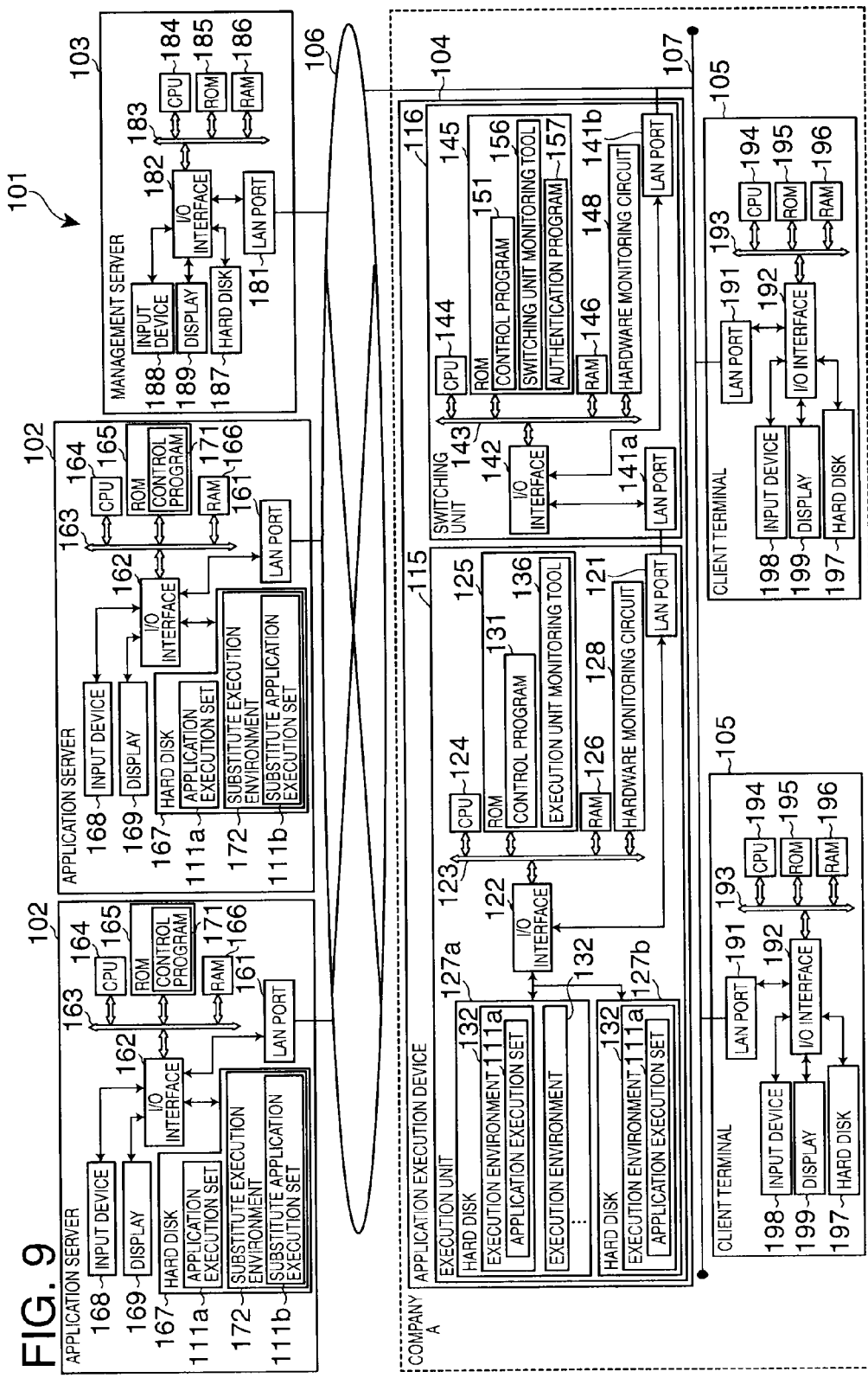
FIG. 9 shows the control arrangement of the application execution system according to the second embodiment of the invention.

The control arrangement of the components (application server 102, management server 103, application execution device 104, and client terminal 105) of the application execution system 101 according to this embodiment of the invention is described next with reference to FIG. 9.

The application execution device 104 has an execution unit 115 that runs the application execution set 111*a*, and a switching unit 116 that forwards execution requests and the results returned by the application execution set 111*a*. The application execution device 104 has a single power supply, the execution unit 115 has an execution unit power supply circuit (not shown in the figure) that supplies power to the execution unit 115 from the main power supply, and the switching unit 116 has a switching unit power supply circuit (not shown in the figure) that supplies power to the switching unit 116 from the main power supply. If the execution unit power supply circuit fails, this arrangement enables supplying power to the switching unit 116 through the switching unit power supply circuit from the single main power supply so that the switching unit 116 can pass execution requests from the client terminal 105 to the application server 102 and the client terminal 105 can get the execution result (output data) from the application server 102.

Figure 10A:
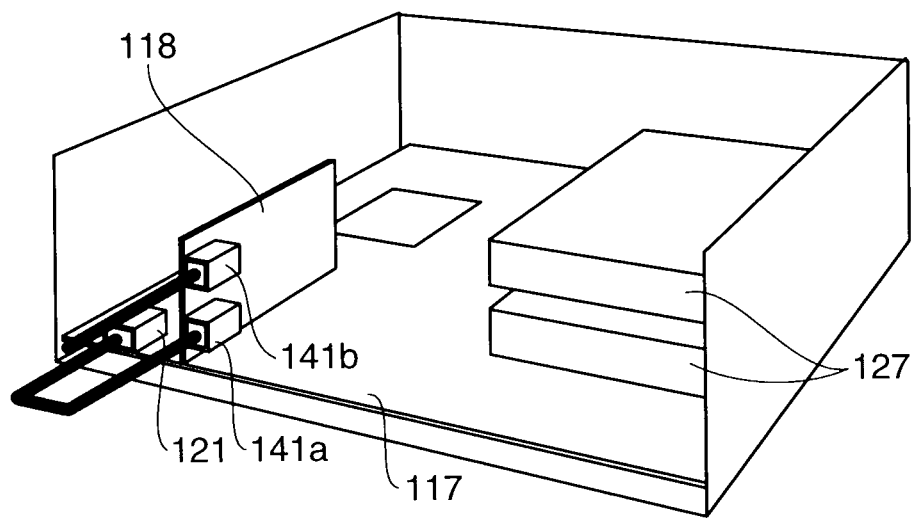
FIG. 10A schematically shows the internal arrangement of the application execution device in the second embodiment of the invention when the front is open, and FIG. 10B schematically shows the internal arrangement of the application execution device in the second embodiment of the invention when the front is closed.
Figure 10B:
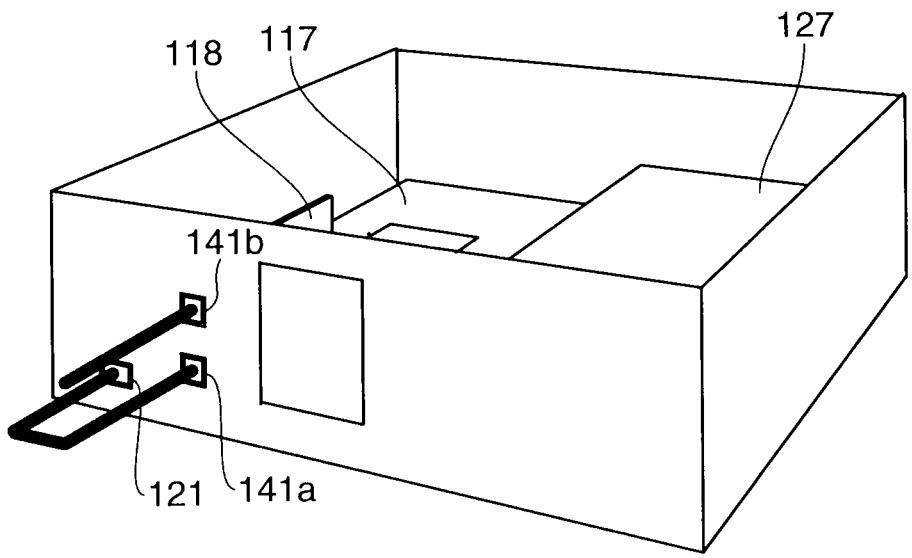

Referring to FIG. 10A and FIG. 10B, the execution unit 115 (not illustrated) is located on an execution board 117 positioned at the bottom inside the case of the application execution device 104, and the switching unit 116 (not illustrated) is located on a switching card 118 that plugs into the execution board 117.

Referring again to FIG. 9, the execution unit 115 has a LAN port 121, an I/O interface 122, an internal bus 123, a CPU 124 (central processing unit), ROM 125 (read-only memory), RAM 126 (random-access memory), a hardware monitoring circuit 128, and two hard disk drives 127*a* and 127*b*. A control program 131 and execution unit monitoring tool 136 are stored in ROM 125, and a plurality of execution environments 132 that are built for executing an application execution set 111*a* are stored in the hard disk drives 127*a* and 127*b*. The hard disk drives 127*a* and 127*b* are in a RAID configuration to improve access speed and data redundancy. The execution environment 132 is functionally identical to the execution environment 32 in the first embodiment shown in FIG. 3.

The execution unit monitoring tool 136 constantly or periodically sends hardware information for the execution unit 115 monitored by the hardware monitoring circuit 128 to the switching unit 116. When the switching unit 116 receives the hardware information from the execution unit 115 it switches the forwarding address of the execution requests from the client terminal 105 based on the received hardware information. This hardware information includes, for example, the temperature and usage of the CPU 124, the fan speed, RAM 126 usage, and the operating voltage of the execution unit 115.

The control program 131 controls execution of the application execution set 111*a* using the CPU 124. When an application execution set 111*a* execution request is received from the client terminal 105, the CPU 124 runs the application execution set 111*a* and sends the result through the switching unit 116 to the client terminal 105.

The switching unit 116 has two LAN ports 141*a* and 141*b*, an I/O interface 142, an internal bus 143, a CPU 144 (central processing unit), ROM 145 (read-only memory), RAM 146 (random access memory), and a hardware monitoring circuit 148. A control program 151, authentication program 157, and switching unit monitoring tool 156 are stored in ROM 145.

Of the two LAN ports 141*a* and 141*b*, one LAN port 141*a* is connected directly to the LAN port 121 of the execution unit 115, the other LAN port 141*b* is connected through the in-house LAN 107 to the client terminal 105 and the application server 102.

Based on the hardware information sent from the execution unit 115, the switching unit monitoring tool 156 determines whether the execution unit 115 can execute the application execution set 111*a*. In this case the standard for determining if the execution unit 115 can run the application execution set 111*a* is stored in the ROM 145, and the switching unit 116 determines the status of the execution unit 115 based on whether the hardware information received from the execution unit 115 satisfy this standard. This evaluation standard is the minimum hardware configuration and state required for the execution unit 115 to execute the application execution set 111*a* stably, and includes, for example, the temperature and usage of the CPU 124, the fan speed, RAM 126 usage, and the operating voltage of the execution unit 115.

Based on the result of this determination the control program 151 controls the process of switching the address of the execution request using the CPU 144. If the hardware information received from the execution unit 115 meets the standard, the switching unit 116 determines that the execution unit 115 can execute the application execution set 111*a*, passes the execution request to the execution unit 115, and the execution unit 115 then executes the application execution set 111*a*. If the received hardware information does not meet the standard, the switching unit 116 determines that the execution unit 115 cannot execute the application set and passes the execution request to the application server 102 so that the application server 102 executes the application execution set 111a instead. If the hardware information is not sent from the execution unit 115 to the switching unit 116 for a prescribed time because of a hardware failure in the execution unit 115, a poor connection between the execution unit 115 and the switching unit 116, or because the execution unit 115 power is off, for example, the switching unit 116 determines that the execution unit 115 cannot execute the application set and again passes the execution request to the application server 102 so that the application server 102 executes the application execution set 111a instead.

Based on the execution request the switching unit 116 receives from the client terminal 105, the authentication program 157 controls an authentication process to determine if the client terminal 105 is authorized to execute the application execution set 111a using the CPU 144. In this case the terminal name and password of the client terminals 105 that are allowed to execute the application execution set 111a are stored together in the ROM 145, and the switching unit 116 authenticates the client terminal 105 based on this terminal name and password information. When the switching unit 116 receives an execution request from the client terminal 105, the switching unit 116 requires the client terminal 105 (user) to input the terminal name and password. When the user enters the terminal name and password to the switching unit 116 from the client terminal 105, the CPU 144 references the authentication data in the ROM 145. Authentication succeeds only if the values match, and the execution request is then passed to the execution unit 115 or the application server 102. If the values do not match, and an authentication failure report is returned to the client terminal 105. This improves the security of the application execution system 101, enables controlling which application execution set 111a can be executed by which client terminal 105, and thus enables allocating each client terminal 105 to specific tasks as desired. Permission to execute the application execution sets 111a can alternatively be controlled based on the IP address or MAC address instead of the foregoing authentication process.

The application execution device 104 synchronizes with the application server 102, and the control program 151 controls the synchronization process between the execution unit 115 and the application server 102 using the CPU 144. By thus synchronizing the execution unit 115 and application server 102, the application server 102 can be used as a backup server for the application execution device 104 and the system can be deployed at a lower cost than if a separate backup device was connected to the in-house LAN 107. This synchronization data includes account information used for authentication settings and to permit executing the application execution set, and session information used to assure the continuity of the execution process when there is a problem with the execution unit 115.

Instead of supplying power from a single power supply to the execution unit 115 and the switching unit 116, an execution unit power supply for the execution unit 115 and a switching unit power supply for the switching unit 116 are separately provided. If the execution unit power supply fails in this arrangement, power is still supplied from the switching unit power supply to the switching unit 116, and the application execution system 101 can be operated with greater stability.

The application server 102 has an input device 168, a display 169, a LAN port 161, an I/O interface 162, an internal bus 163, a CPU 164, ROM 165, RAM 166, and a hard disk drive 167. The control program 171 is stored in the ROM 165. The application execution set 111a that is delivered to the application execution device 104, a substitute application execution set 111b that is identical to the application execution set 111a, and a substitute execution environment 172 for running the substitute application execution set 111b are stored in the hard disk drive 167.

The control program 171 is for controlling distributing and substitute execution of the application execution set 111a using the CPU 164. The application execution set 111a distribution process causes the CPU 164 to distribute the application execution set 111a stored in the hard disk drive 167 according to the request received from the application execution device 104. When the CPU 164 sends the application execution set 111a to the application execution device 104, it creates a copy of the application execution set 111a stored in the hard disk drive 167 as substitute application execution set 111b, and writes the copied substitute application execution set 111b to the substitute execution environment 172.

When the execution unit 115 of the application execution device 104 cannot execute the application execution set 111a and an execution request from the client terminal 105 is forwarded from the switching unit 116, the CPU 164 runs the substitute application execution set 111b in the substitute execution environment 172 and returns the result to the client terminal 105. The result in this case can be returned to the client terminal 105 through the switching unit 116 or directly to the client terminal 105.

The management server 103 (reference numerals 181 to 189) and the client terminal 105 (reference numerals 191 to 199) have the same hardware configuration as the application server 102 and further description thereof is thus omitted.

Figure 11:
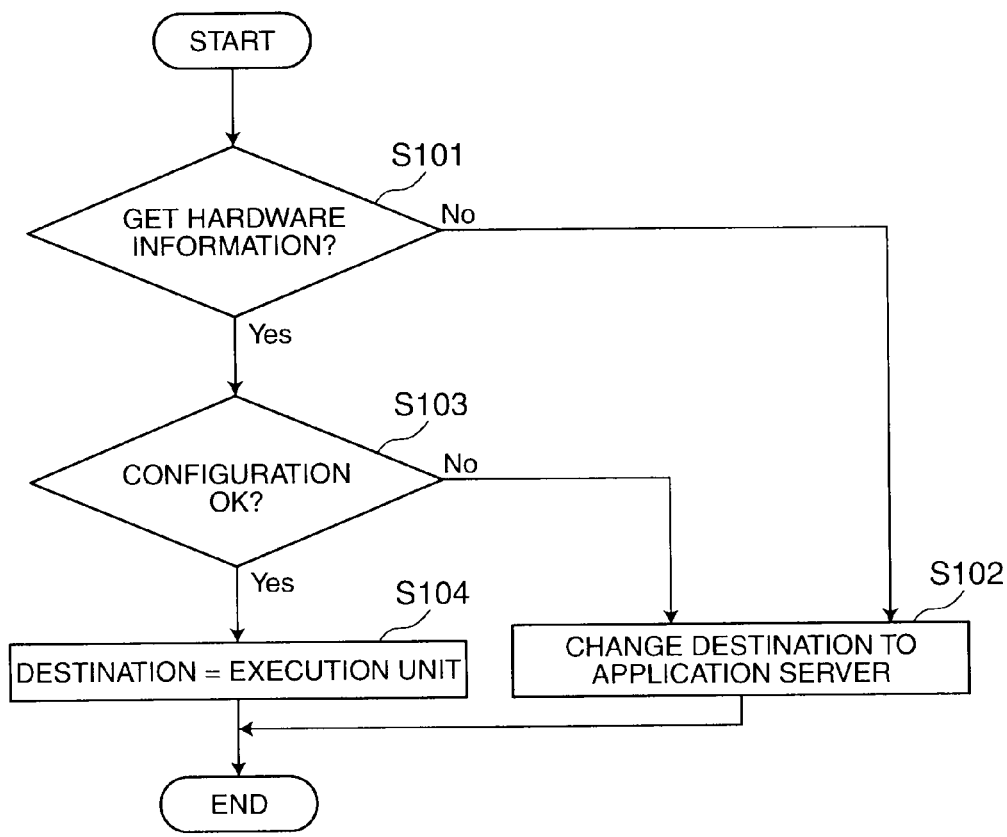
FIG. 11 is a flow chart of the process for switching the address of execution requests from the client terminal in the application execution system according to the second embodiment of the invention.

Changing the address of the execution request from the client terminal 105 in this application execution system 101 and executing the application execution set 111a is described next. The process of changing the address to which execution requests from the client terminal 105 are sent is described first with reference to the flow chart in FIG. 11.

When the address to which the switching unit 116 sends execution requests from the client terminal 105 is set to the execution unit 115 and the switching unit 116 cannot get the hardware information from the execution unit 115 for a prescribed time (S101 returns No), the switching unit 116 determines that an error occurred with the execution unit 115 and changes the address of the execution request from the client terminal 105 to the application server 102 (S102). If the switching unit 116 gets the hardware information from the execution unit 115 (S101 returns Yes), the switching unit 116 determines if the hardware information meets the evaluation standard (S103). If it does not (S103 returns No), the switching unit 116 determines that the execution unit 115 cannot execute the application execution set 111a and changes the address of the execution request from the client terminal 105 to the application server 102 (S102). If the hardware information meets the evaluation standard (S103 returns Yes), the switching unit 116 holds the address of execution requests from the client terminal 105 set to the execution unit 115 (S104).

Figure 12:
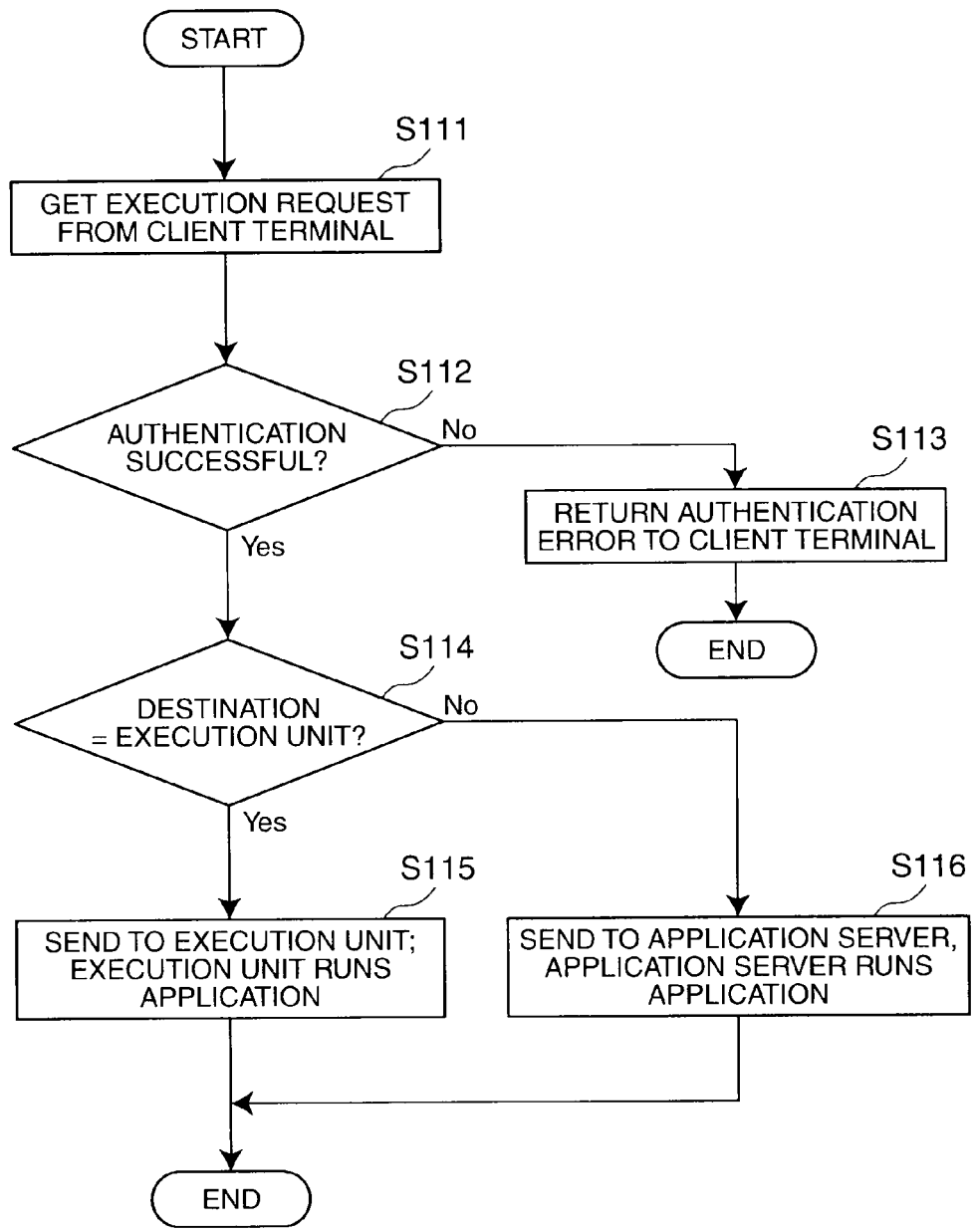
FIG. 12 is a flow chart of the application execution set acquisition process in the application execution system according to the second embodiment of the invention.

Executing the application execution set 111a is described next with reference to the flow chart in FIG. 12.

When the switching unit 116 receives an application execution set 111a execution request from the client terminal 105 (S111), the switching unit 116 determines if the client terminal 105 is authorized to execute the application execution set 111a (S112). If the client terminal 105 fails authentication (S112 returns No), the switching unit 116 returns an authentication failure report to the client terminal 105 (S113).

If client terminal 105 authentication succeeds (S112 returns Yes), the switching unit 116 passes the execution request to the address set by the switching process described above. If the address of the execution request is the execution unit 115 (S114 returns Yes), the execution request is sent to the execution unit 115 and the execution unit 115 executes the application execution set 111a (S115). If the execution request address is not the execution unit 115 (the address of the execution request is the application server 102) (S114 returns No), the execution request is sent to the application server 102 and the application server 102 executes the substitute application execution set 111b (S116).

This second embodiment of the invention divides the application execution device 104 into an execution unit 115 that primarily executes the application execution set 111a and a switching unit 116 that primarily handles data transfers, operates these units separately and thereby distributes the overall processing load of the application execution device 104. This reduces the heat output of the CPUs 124 and 144 and thus reduces the failure rate of the application execution device 104. In addition, because the processing load of the switching unit 116 is generally less than that of the execution unit 115, switching unit 116 failures can be minimized and system stability can be improved.

Furthermore, if the execution unit 115 of the application execution device 104 cannot execute the application execution set 111a (because of a hardware failure, for example), the switching unit 116 can pass the execution request from the client terminal 105 to the application server 102, which has the same substitute application execution set 111b as the application execution set 111a, because the switching unit 116 operates independently of the execution unit 115, and the result of executing the application execution set 111a (the output data) can be acquired from the application server 102.

In addition, because execution requests from the client terminal 105 to the application execution device 104 are automatically transferred to the application server 102 if the execution unit 115 of the application execution device 104 fails, the address to which execution requests are sent does not need to be changed on the client terminal 105 every time a problem occurs in the execution unit 115. The client terminal 105 can therefore get the result of running the application execution set 111a without being aware of the problem with the execution unit 115. In addition, because the switching unit 116 is inside the application execution device 104, less space is required compared with an arrangement having the switching unit 116 located in a separate device.

Furthermore, when the application execution device 104 receives application execution sets 111a from a plurality of application servers 102, a substitute execution process is executed for each application execution set 111a. As a result, an error in one application execution set 111a will not interrupt executing other application execution sets 111a on the in-house LAN 107.

In addition, because a backup of each application execution set 111a is made on the original application server 102, error recovery is easier than when all application execution sets 111a are backed up on a single backup server.

Instead of the application server 102 executing the application execution set 111b when an execution unit 115 error occurs, a dedicated substitute execution server could alternatively be separately provided for executing the application execution set as needed.

The first embodiment described above can also be applied in this second embodiment. More specifically, an execution environment 132 for the application execution set 111a can be provided in the execution unit 115. If the application execution set 111a is normal and an application execution set 111a execution request is received from the client terminal 105, the CPU 124 can run the application execution set 111a and return the result to the client terminal 105. In addition, if a response signal is received from the response program the CPU 144 of the switching unit 116 knows that execution is normal, but determines that an error has occurred if a response is not received. If an error with application execution set 111a execution is detected and an application execution set 111a execution request is received from the client terminal 105, the execution request is passed to the application server 102.

A third embodiment of the invention is described next. In this embodiment of the invention the client terminal and the application execution device are connected to the second network through a gateway device that relays data. The server is also hidden from the client terminal by having the gateway relay execution requests to the server that has the application by having the client terminal specify the application and sending the execution request to the gateway.

Figure 13:
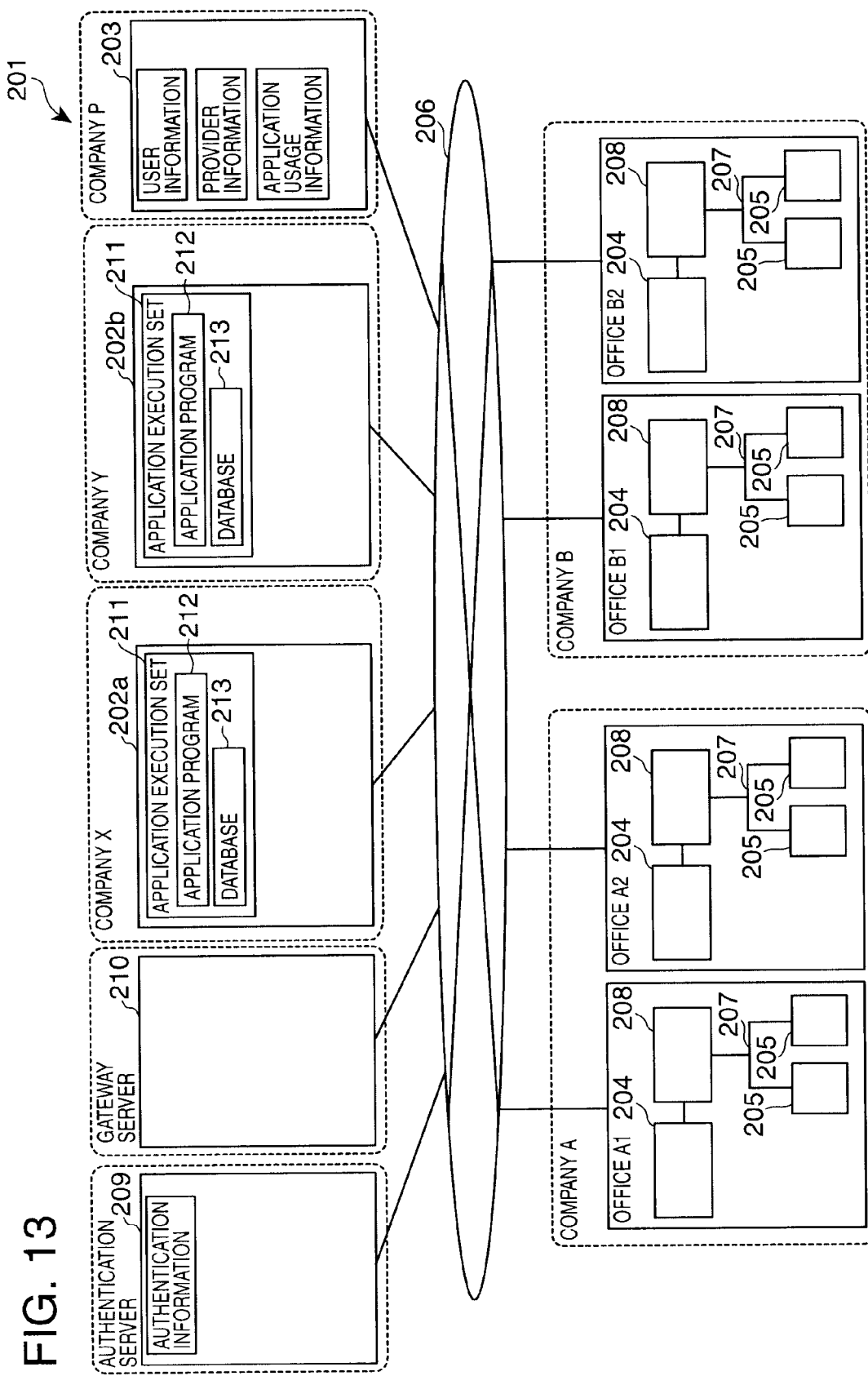
FIG. 13 is a system diagram of the application execution system according to a third embodiment of the invention.

FIG. 13 is a system diagram of the application execution system 201 according to this third embodiment of the invention.

The application execution system 201 according to this embodiment of the invention includes a plurality of application servers 202a and 202b, which are owned by a plurality of vendors (company X and company Y) that provide the application execution sets 211 (applications), a single management server 203 that is owned by the platform manager (company P) that operates the application execution system 201, a gateway server 210 that relays data to the application servers 202, an authentication server 209 that authenticates data addressed to the application server 202, and offices A1, A2, B1, B2 of the plural users (company A and company B) that use the application execution sets 211 connected by the Internet 206 (first network).

Each of the offices has an application execution device 204 that executes the application execution set 211, two client terminals 205 that assert requests to execute an application execution set 211 to the application execution device 204, and a gateway 208 that relays data traffic between the client terminals 205, the application execution device 204, and the 206 connected to an in-house LAN 207 (second network). Data is encapsulated for communication between the gateway 208 and the application execution device 204 and between the gateway 208 and the gateway server 210 in order to prevent data theft and unauthorized access.

An application execution set 211 as used herein includes an application program 212 and one or more databases 213 that are used when executing the application program 212.

The management server 203 and the application execution device 204 are used to provide substantially the same function as the management server 3 and the application execution device 4 of the first embodiment.

In addition to delivering application execution sets 211 in response to requests from an application execution device 204, the application server 202 also returns the execution result through the gateway server 210 to the client terminal 205 instead of the application execution device 204 when a problem occurs while executing the application execution set 211 on the application execution device 204. In this case the application server 202 stores the same application execution set 211 as the application execution set 211 run by the application execution device 204, and returns the same output result by running the same application execution set 211. The application server 202 can therefore also function as a substitute application execution device, and thus enables constructing a system at a lower cost than providing a separate new server as the substitute application execution device.

When the application execution set 211 is not stored on the application execution device 204, the application server 202 still runs the application execution set 211 and returns the result through the gateway 208 to the client terminal 205. More specifically, the application server 202 stores an application execution set 211 for delivery and an application execution set 211 for execution.

In addition, the application programs 212 may be created in different development environments by different vendors, and the databases 213 are written for each application program 212.

The gateway 208 relays communication on the in-house LAN 207 and receives execution requests from the client terminals 205. When an execution request from a client terminal 205 is received, the gateway 208, and not the client terminal 205, sends the request to the application execution device 204. In addition, if there is a problem with the application execution set 211 or the application execution set 211 is not stored on the application execution device 204 when an execution request from a client terminal 205 is received, the application execution device 204 sends the execution request to the application server 202. The client terminal 205 thus specifies the desired application execution set 211 and sends the execution request to the gateway 208, and gets the resulting output data from the application execution device 204 or the application server 202 through the gateway 208 regardless of the status of the application execution device 204.

The gateway server 210 relays data between the gateway 208 and the application server 202. More specifically, communication between the gateway 208 and the application server 202 passes through the gateway server 210.

The authentication server 209 handles authentication of execution requests from the gateway 208 to the gateway server 210. Execution requests from the gateway 208 are thus always pass through the gateway server 210 and are authenticated by the authentication server 209, thereby preventing unauthorized access to the application server 202 and improving security.

Figure 14:
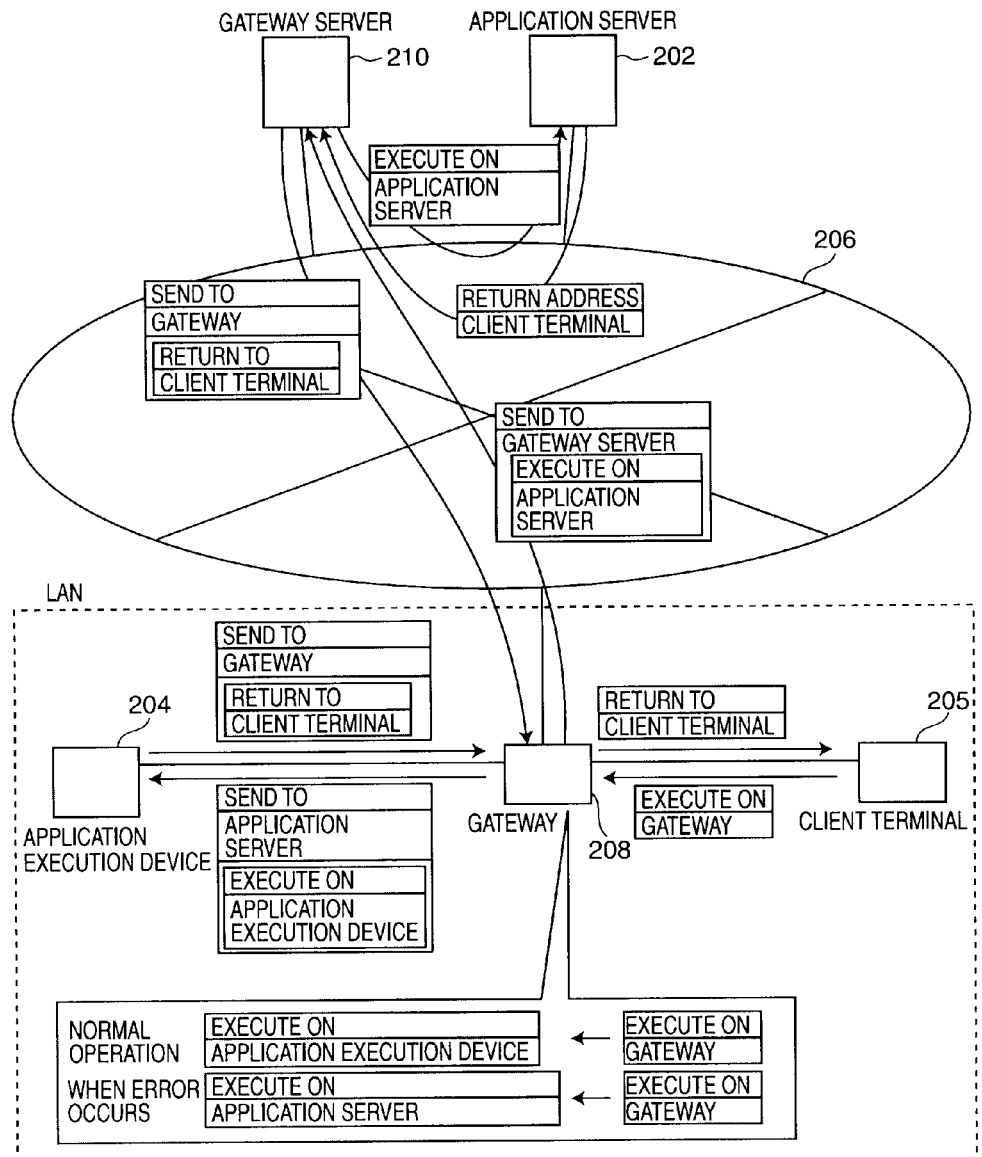
FIG. 14 shows the network configuration of the application execution system according to the third embodiment of the invention.

Communication of execution request and resulting output data from the application execution sets 211 is described briefly next with reference to the network diagram shown in FIG. 14. Communication of execution requests and resulting output data when operation is normal is described first.

When the client terminal 205 sends an execution request to the gateway 208, the gateway 208 converts the execution request address from the gateway 208 to the application execution device 204, encapsulates the execution request with the application execution device 204 as the addressee, and sends the encapsulated execution request to the application execution device 204. The application execution device 204 then decapsulates the encapsulated execution request and runs the application execution set 211. The application execution device 204 also encapsulates and sends the resulting output data to the gateway 208. The gateway 208 decapsulates the encapsulated output data and passes the data to the client terminal 205.

Communication of execution requests and resulting output data when an error occurs is described next.

When the client terminal 205 sends an execution request to the gateway 208, the gateway 208 converts the execution request address from the gateway 208 to the application server 202, encapsulates the execution request with the gateway server 210 as the addressee, and sends the encapsulated execution request to the gateway server 210. The gateway server 210 then decapsulates and passes the decapsulated execution request to the application server 202. The application server 202 then runs the application execution set 211 based on the execution request received from the gateway server 210 and sends the result to the gateway server 210. The gateway server 210 then encapsulates and sends the resulting output data to the gateway 208. The gateway 208 then decapsulates the encapsulated output data and passes the data to the client terminal 205.

Figure 15:
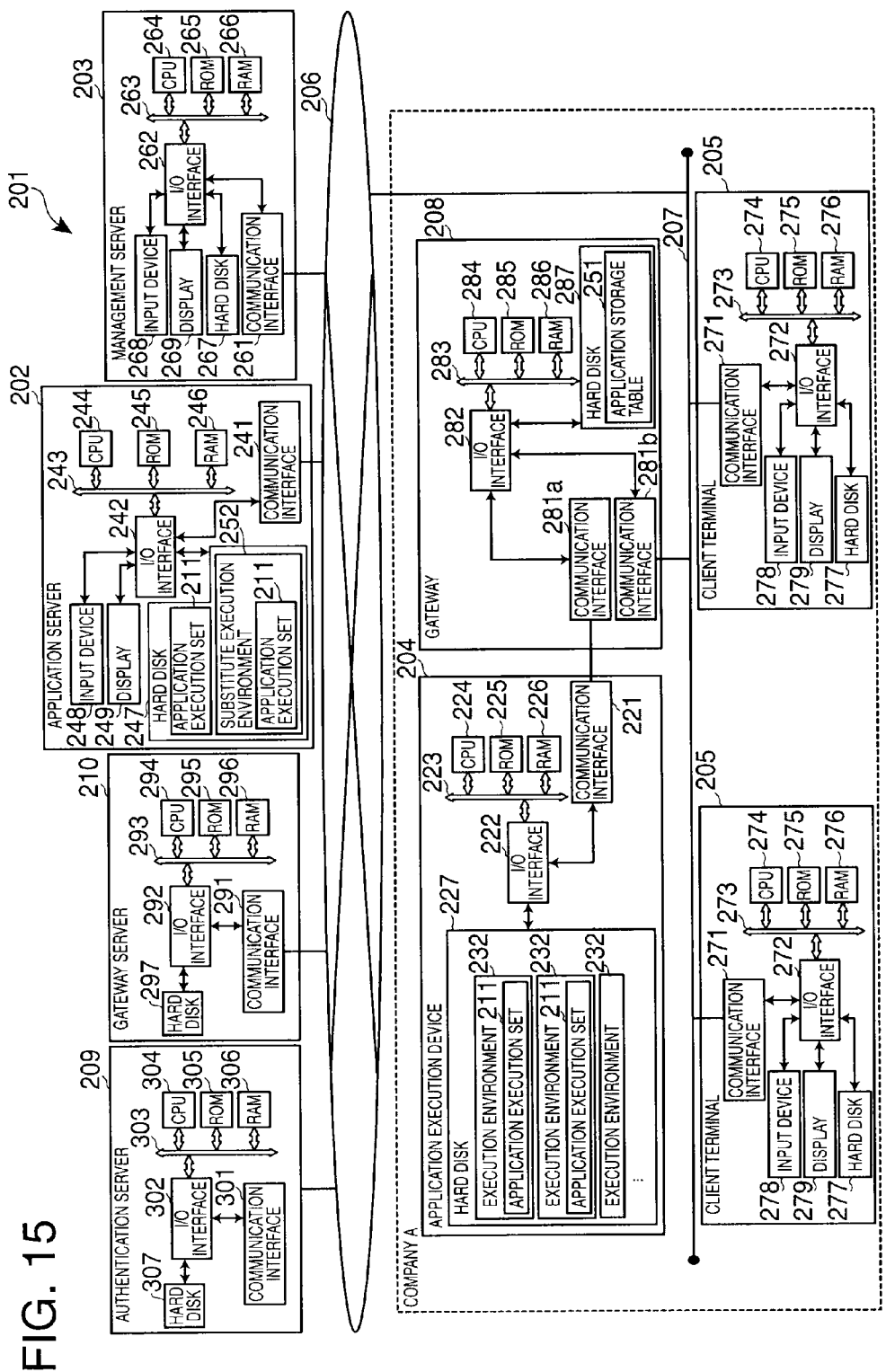
FIG. 15 shows the control arrangement of the application execution system according to the third embodiment of the invention.

Controlling the components (application server 202, management server 203, gateway server 210, authentication server 209, application execution devices 204, gateways 208, and client terminals 205) of the application execution system 201 according to this embodiment of the invention is described next with reference to FIG. 15.

The gateway 208 has two communication interfaces 281a and 281b, an I/O interface 282, an internal bus 283, a CPU 284 (central processing unit), ROM 285 (read-only memory), RAM 286 (random-access memory), and a hard disk drive 287. A control program and gateway monitoring tool (not shown in the figure) are stored in ROM 285, and an application storage table 251 is stored in the hard disk drive 287.

Of the two communication interfaces 281a and 281b, one communication interface 281a is connected directly to the communication interface 221 of the application execution device 204, and the other communication interface 281b is connected through the in-house LAN 207 to the client terminal 205 and gateway server 210.

The gateway monitoring tool determines whether the application execution device 204 can run the application execution set 211 based on hardware information sent constantly or periodically from the application execution device 204. In this case the standard for determining if the application execution device 204 can run the application execution set 211 is stored in the ROM 285, and the gateway 208 determines the status of the application execution device 204 based on whether the hardware information received from the application execution device 204 satisfy this standard. More specifically, if the hardware information received from the application execution device 204 satisfies this standard, the gateway 208 determines that the application execution device 204 is in a state enabling executing the application execution set 211. If the hardware information does not meet the standard, the gateway 208 determines that the application execution device 204 cannot run the application execution set 211.

This hardware information includes, for example, the temperature and usage of the CPU 224 of the application execution device 204, the fan speed, RAM 226 usage, and the operating voltage of the application execution device 204. This evaluation standard is the minimum hardware configuration required for the application execution device 204 to run the application execution set 211 stably, and includes, for example, the temperature and usage of the CPU 224, the fan speed, RAM 226 usage, and the operating voltage of the application execution device 204.

The application storage table 251 shown in FIG. 16A is used to determine the execution request address of the application execution set 211, and includes the application execution set name and the URL of the device storing the set. The gateway 208 references the application storage table 251 to determine the execution request address based on the name of the application execution set specified by the client terminal 205. In the example shown in FIG. 16A, application A, application B, and application C are stored on the application execution device and on application server A, application server B, and application server C, respectively. Application D is only stored on application server D. The URLs contained in the application storage table 251 can be input as desired by the user or the gateway 208 can automatically get the URLs of the application execution sets 211 from the management server 203.

The control program is run by the CPU 284 to control converting the execution request address of the application execution set 211 based on the result from the gateway monitoring tool and the address of the application execution set 211 stored in the application storage table 251. When the gateway 208 receives an execution request from a client terminal 205, the gateway 208 refers to the application storage table 251 and determines if the application execution set 211 specified by the client terminal 205 is stored on the application execution device 204, and converts the execution request address of the application execution set 211 based on whether or not the application execution device 204 can run the application execution set 211.

More specifically, if the application execution set 211 is stored in the application execution device 204 and the hardware information meets the evaluation criteria, the execution request address is changed from the gateway 208 to the application execution device 204. If the application execution set 211 is not stored in the application execution device 204, or if the hardware information does not meet the evaluation criteria, the execution request address is changed from the gateway 208 to the application server 202 that stores the application execution set 211.

For example, if the client terminal 205 sends an execution request for application A to the gateway 208 and the application execution device 204 can execute the application, the gateway 208 changes the execution request address from the gateway to the application execution device (see FIG. 16B). However, if the application execution device 204 cannot run the application, the gateway 208 changes the execution request address from the gateway to application server A (see FIG. 16C). If the client terminal 205 sends an execution request to the gateway 208 for application D, which is not stored in the application execution device 204, the gateway 208 changes the execution request address from the gateway to application server D (see FIG. 16A).

An encapsulation/decapsulation program that is used for encapsulated communication between the application execution device 204 and the gateway server 210 is included in the control program. Encapsulation is described briefly with reference to FIG. 17A and FIG. 17B.

Figure 17B:
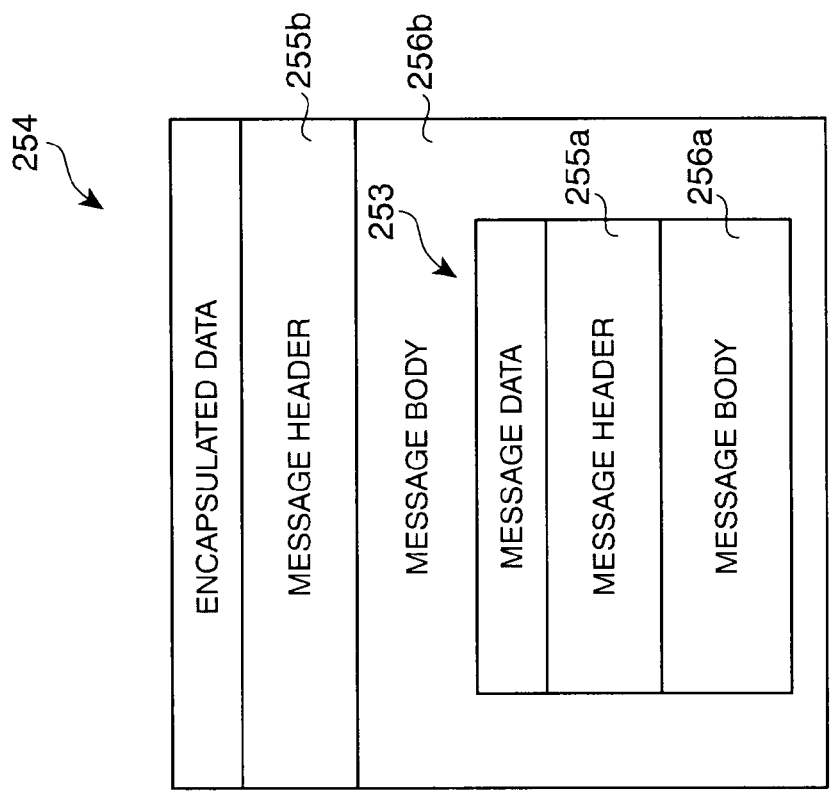
FIGS. 17A and 17B show the message encapsulation and decapsulation processes in the third embodiment of the invention.
Figure 17A:
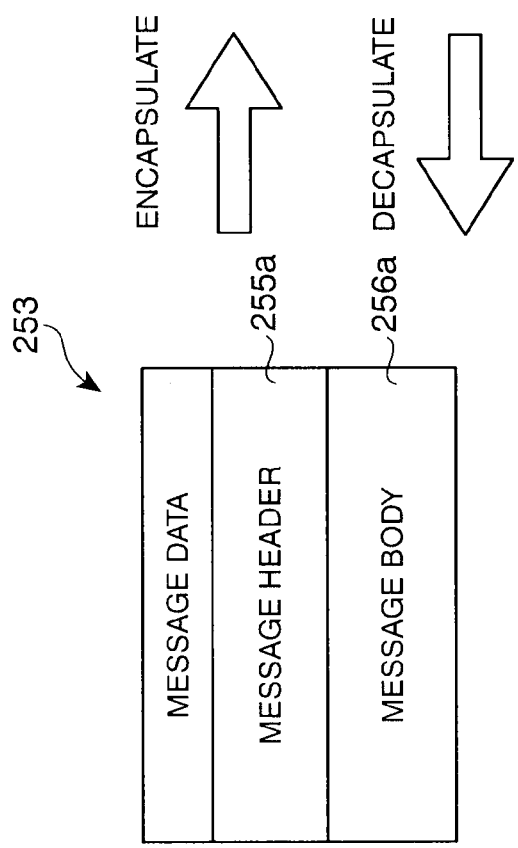

FIG. 17A shows the message data 253 containing an execution request or the resulting output data, and includes a message header 255a containing the address and a message body 256a containing the execution command or resulting response from the application execution set 211. FIG. 17B shows the encapsulated data 254 after encapsulating the message data 253. The encapsulated data 254 includes a message header 255b containing the address and authentication information, and a message body 256b containing the message data 253. Encapsulating thus wraps the message data 253 inside the encapsulated data 254.

The encapsulation and decapsulation processes of the gateway 208 are described next.

The encapsulation process executed when the gateway 208 receives an execution request from the client terminal 205 is described first. When an execution request is received from the client terminal 205, the gateway 208 references the application storage table 251 and changes the address. The gateway 208 then writes the execution request from the client terminal 205 into the message body 256b, writes the URL of the application execution device 204 or gateway server 210 as the addressee and an authentication ID and password as the authentication information in the message header 255b, and thus encapsulates the execution request. The gateway 208 then sends the encapsulated execution request to the specified address, that is, the application execution device 204 or the gateway server 210, and requests execution instead of the client terminal 205.

The decapsulation process that runs when the gateway 208 receives the encapsulated output data from the application execution device 204 or the gateway server 210 is described next.

When the encapsulated output data is received from the application execution device 204 or the gateway server 210, the gateway 208 reads the message header 255b that is set to the URL of the gateway 208 as the addressee and decapsulates the message. The gateway 208 then passes the decapsulated output data to the client terminal 205.

The application execution device 204 has a communication interface 221, an I/O interface 222, an internal bus 223, a CPU 224, a ROM 225, RAM 226, and hard disk drive 227. A control program and application execution device monitoring tool are stored in ROM 225. A plurality of execution environments 232 that are written for executing the application execution sets 211 are stored on the hard disk drive 227. These execution environments 232 have substantially the same function as the execution environments in the first embodiment (see FIG. 3).

The application execution device monitoring tool constantly or periodically sends hardware information to the gateway 208. When hardware information is received from the application execution device 204, the gateway 208 evaluates the status of the application execution device 204 based on the received information.

The control program is run by the CPU 224 to control the application execution set 211 execution process. An encapsulation/decapsulation program that is used for encapsulated communication with the gateway 208 and an authentication program are included in the control program.

When the application execution device 204 receives an encapsulated execution request from the gateway 208, the application execution device 204 decapsulates the execution request only if authentication by the authentication program is successful, runs the application execution set 211 according to the execution request, and encapsulates and sends the resulting output data to the gateway 208.

More specifically, an authentication ID and password for enabling executing the application execution set 211 are stored in the ROM 225. When an encapsulated execution request is received from the gateway 208, the application execution device 204 authenticates the request by comparing the authentication information set in the message header 255b with the authentication information in ROM 225. If the authentication information matches, authentication is successful, and the message header 255b containing the URL of the addressed application execution device 204 is extracted and decapsulated. The application execution device 204 then runs the application execution set 211, writes the resulting output data to the message body 256b, attaches a message header 255b with the URL of the gateway 208 set as the address and encapsulates the message, and then sends the encapsulated message to the gateway 208.

If authentication fails, an authentication request is sent to the gateway 208. Note that once authentication succeeds an authentication successful flag is set so that the application execution device 204 can omit the authentication process the next time.

The gateway server 210 has a communication interface 291, an I/O interface 292, an internal bus 293, a CPU 294, ROM 295, RAM 296, and hard disk drive 297. A control program is stored in the ROM 295.

The CPU 294 runs the control program to control the data relay process. An encapsulation/decapsulation program that is used for encapsulated communication with the gateway 208 and an authentication program are included in the control program.

When an encapsulated execution request is received from the gateway 208, the gateway server 210 authenticates the request using the authentication server 209, and decapsulates and sends the request to the application server 202 only if authentication is successful. When the resulting output data is received from the application server 202, the gateway server 210 encapsulates and sends the result to the gateway 208.

More specifically, an authentication ID and password for enabling executing the application execution set 211 are stored in the ROM 295 of the authentication server 209, the gateway server 210 sends the authentication information to the authentication server 209, and the authentication process runs on the authentication server 209.

When the authentication server 209 receives authentication information from the gateway server 210, the authentication server 209 authenticates the request by comparing the authentication information set in the message header 255b with the authentication information stored on the authentication server 209. If the authentication information matches, authentication is successful, and the message header 255b containing the URL of the addressed gateway server 210 is extracted and decapsulated. The decapsulated execution request is then sent to the application server 202.

If authentication fails, an authentication request is sent to the gateway 208.

When the resulting output data is received from the application server 202, the gateway server 210 writes the resulting output data to the message body 256b, attaches a message header 255b with the URL of the gateway 208 set as the address and encapsulates the message, and then sends the encapsulated message to the gateway 208.

Note that once authentication succeeds an authentication successful flag is set so that the authentication server 209 can omit the authentication process the next time.

The application server 202 has an input device 248, a display 249, a communication interface 241, an I/O interface 242, an internal bus 243, a CPU 244, ROM 245, RAM 246, and hard disk drive 247. A control program is stored in ROM 245. An application execution set 211 for serving to the application execution device 204, an identical copy of the application execution set 211 for running locally, and a substitute execution environment 252 for running the application execution set 211 locally are stored in the hard disk drive 247.

The control program is run by the CPU 244 to control serving and local (substitute) execution of the application execution set 211. In the application execution set 211 serving process the CPU 244 serves the application execution set 211 stored in the hard disk drive 247 according to an execution request from the application execution device 204. When an application execution set 211 is served to an application execution device 204, the CPU 244 creates an identical copy of the served application execution set 211 on the hard disk drive 247, and allocates the copied application execution set 211 to the substitute execution environment 252.

If the application execution device 204 becomes unable to run the application execution set 211 and an execution request is received from the gateway server 210, the CPU 244 runs the application execution set 211 in the substitute execution environment 252 and returns the resulting output data to the client terminal 205 through the gateway server 210.

The management server 203 (reference numerals 261 to 269), the authentication server 209 (reference numerals 301 to 306), and the client terminal 205 (reference numerals 271 to 279) have substantially the same hardware configuration as the application server 202 and further description thereof is thus omitted.

Figure 18:
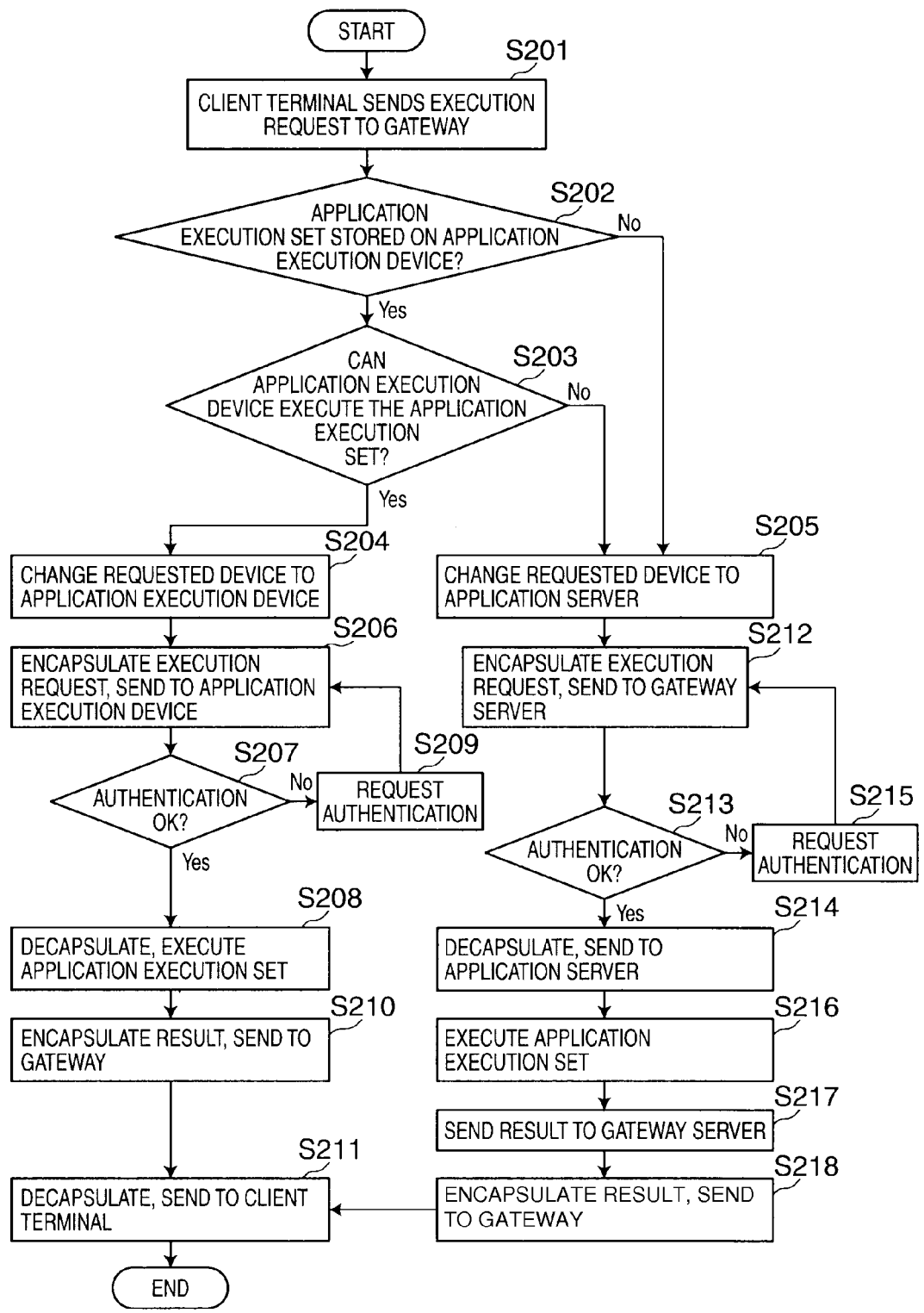
FIG. 18 is a flow chart of the application execution set execution process in the application execution system according to the third embodiment of the invention.

Running an application execution set 211 in the application execution system 201 according to this embodiment of the invention is described next with reference to the flow chart in FIG. 18.

When the client terminal 205 specifies an application execution set 211 and sends an execution request addressed to the gateway 208 (S201), the gateway 208 references the application storage table 251 and determines if the specified application execution set 211 is stored in the application execution device 204 (S202). If the gateway 208 determines that the specified application execution set 211 is not stored on the application execution device 204 (S202 returns No), the gateway 208 changes the execution request address from the gateway 208 to the application server 202 (S205). If the specified application execution set 211 is stored on the application execution device 204 (S202 returns Yes), the gateway 208 determines if the application execution device 204 can execute the application execution set 211 (S203).

If the gateway 208 determines that the application execution device 204 cannot run the application execution set 211 (S203 returns No), it changes the execution request address form the gateway 208 to the application server 202 (S205). If the application execution device 204 can run the application execution set 211 (S203 returns Yes), the gateway 208 changes the execution request address from the gateway 208 to the application execution device 204 (S204).

If the execution request address is changed to the application execution device 204, the gateway 208 encapsulates and sends the request to the application execution device 204 (S206).

When the application execution device 204 receives the encapsulated request, it runs the authentication process (S207). If authentication fails (S207 returns No), the application execution device 204 sends an authentication request to the gateway 208 (S209). If authentication succeeds (S207 returns Yes), the application execution device 204 decapsulates the request, runs the application execution set 211 (S208), and encapsulates and sends the result to the gateway 208 (S210).

The gateway 208 then decapsulates the encapsulated result and sends the resulting data to the client terminal 205 (S211).

If the execution request address is changed to the application server 202, the gateway 208 encapsulates and sends the request to the gateway server 210 (S212). When the encapsulated execution request is received, the gateway server 210 runs the authentication process on the authentication server 209 (S213).

If authentication on the authentication server 209 fails (S213 returns No), the gateway server 210 runs the authentication process on the gateway 208 (S215).

If authentication on the authentication server 209 succeeds (S213 returns Yes), the gateway server 210 decapsulates and passes the request to the application server 202 (S214). Based on the received execution request, the application server 202 then runs the application execution set 211 (S216) and returns the result to the gateway server 210 (S217). The gateway server 210 then encapsulates and sends the received result to the gateway 208 (S218).

The gateway 208 then decapsulates the encapsulated result and sends the resulting data to the client terminal 205 (S211).

In the application execution system 201 according to this third embodiment of the invention the client terminal 205 simply specifies the desired application execution set 211 and sends an execution request to the gateway 208. The gateway 208 then automatically converts the execution request addressed to the gateway 208 to the server (application execution device 204 or application server 202) that stores the application execution set 211. The client terminal 205 (user) can thus get the result of running the application execution set 211 without knowing where the application execution set 211 is stored. By thus locating the client terminal 205 behind a gateway 208, the server (application execution device 204 and application server 202) can be hidden from the client terminal 205 and a flexible network can be constructed. For example, when a server is added or replaced, a setting on the gateway 208 can simply be added or changed and the system can be easily changed because the client terminal 205 continues to access the same device.

If the application is not stored on the application execution device 204 or there is a problem with the application execution device 204, the gateway 208 automatically changes the address of the execution request to the application server 202. The address to which the client terminal 205 sends an execution request therefore does not need to be changed whenever a problem occurs.

This embodiment of the invention uses an authentication server 209 and application server 202 in addition to a gateway server 210, but functions to run the authentication process and executing applications can alternatively be formulated in the gateway server 210.

In addition, instead of the application server 202 running the application when there is a problem with the application execution device 204, a separate application server could be provided to run the application when needed instead of the application server 202.

Encryption could also be used together with encapsulated communication between the gateway 208 and gateway server 210 to further protect against leaks and tampering on the 206 and thus strengthen security.

The invention is described above with reference to three preferred embodiments thereof, but the functions of the application execution systems 1, 101, and 201 can alternatively be formulated as a software program. The invention can be implemented in digital electronic circuitry, or in computer hardware, firmware, software, or in combinations of them. The invention can be implemented in a computer program product tangibly embodied in a machine-readable or computer readable storage device for execution by a programmable processor or computer. The program can also be distributed and stored on a tangible recording medium (not shown in the figure). Examples of such recording media include CD-ROM, flash ROM, memory cards (such as Compact Flash (R), smart media, and memory sticks), magneto-optical discs, DVD media, and floppy disks.

The invention is also not limited to the embodiments described above, and the processes of the application execution systems 1, 101, and 201 described above can be modified in many ways without departing from the scope of the accompanying claims.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An application execution system comprising:
an application server having a first memory store housing a plurality of application-execution sets, each application-execution set including a respective application program and any database needed for execution of the respective application program, said application server being further configured to provide a separate first execution-environment within said first memory store for execution of any of said plurality of individual application-execution sets upon request, each first execution-environment including an allotment of computing resources necessary for execution of its respective application-execution set on said application server;
a first gateway providing an authentication-communication interface between said application server and the Internet;
an application execution device having a second memory store, and configured to download select application-execution sets from said application server and creating a second execution-environment within its second memory store for each downloaded application-execution set, each second execution-environment including an allotment of computing resources necessary for execution of its respective application-execution set on said application execution device;
wherein said application server responds to the downloading of each application-execution set to the application execution device by creating a separate first execution-environment for each downloaded application-execution set;
a second gateway having a third memory store housing an application storage table listing the application-execution sets available on said application server and on said application execution device, said second gateway further having a first communication interface connected to a local network and a second communication interface connected directly to said application execution device, said gateway further having access to the Internet; and
a client terminal coupled to said second gateway via said local network, said client terminal being configured to request remote execution on said second gateway of a selected one of said application-executions sets by sending to said second gateway a first remote execution request including a first message package having a first message header including a first execution request address addressed to said second gateway and a first message body including a first execution command for the selected application-execution set;
wherein said second gateway responds to receipt of the first remote execution request from said client by checking its application storage table to determine the location of the selected application-execution set, and
IF the selected execution set is available for execution on said application execution device and the second gateway determines that the application execution device is suitable for execution of the selected execution set,
THEN the second gateway creates a second execution request addressed to the application execution device and sends the second execution request to the application execution device, wherein:
said second execution request encapsulates the first execution request,
the application execution device responds to the second execution request by decapsulating the first execution request, executing the first execution command, and transmitting command execution results to the second gateway, and the second gateway transmits the command execution results received from the application device, to the client device as a response to the client device's first remote execution request;

ELSE the second gateway creates a third execution request and sends the third execution request to the first gateway for execution by the application server, wherein:

said third execution request encapsulates the first execution request, the first gateway responds to the third execution request by decapsulating the first execution request and sending the first execution request to the application server, and the application server executes the first execution command and transmits command execution results to the second gateway, and the second gateway transmits the command execution results received from the application server to the client device as a response to the client device's first remote execution request.

2. The application execution system of claim 1, wherein the second execution request includes a second message package having a second message header including a second execution request address addressed to said application execution device and a second message body encapsulating the first remote execution request in full.

3. The application execution system of claim 1, wherein the third execution request includes a third message package having a third message header including a third execution request address addressed to the first gateway and a second message body encapsulating the first remote execution request in full.

4. The application execution system of claim 1, wherein the application server transmits the command execution results directly to the second gateway.

5. The application execution system of claim 1, wherein the application server transmits the command execution results to the second gateway via the first gateway.

6. The application execution system of claim 1, wherein the first gateway is a gateway server.

7. The application execution system of claim 1, the application execution device transmits the command execution results to the second gateway by encapsulating the command execution results into the first message body of the first remote execution request to create a modified execution request, and sending the modified execution request to the second gateway.

8. The application execution system of claim 1, further having a management server configured monitor the application server and inform the second gateway of the locations of application-execution sets.

9. The application execution system of claim 1, wherein the second gateway determines that the application execution device is suitable for execution of the selected execution set if the hardware conditions of the application execution device meet preset minimum hardware requirements.

10. The application execution system of claim 5, the first gateway transmits the command execution results to the second gateway by encapsulating the command execution results into the first message body of the first remote execution request to create a modified execution request, and sending the modified execution request to the second gateway.

11. The application execution system of claim 9, wherein said minimum hardware requirements include the operating temperature the application execution device's CPU, the usage availability of the application execution device's CPU, usage availability of the application execution device's RAM, the operating voltage of the application execution device, and the fan speed of at least on fan within application execution device.

* * * * *